US012461273B2

(12) United States Patent
Lathrop et al.

(10) Patent No.: US 12,461,273 B2
(45) Date of Patent: Nov. 4, 2025

(54) VEHICLE-BASED ANOMALY DETECTION USING ARTIFICIAL INTELLIGENCE AND COMBINED ENVIRONMENTAL AND GEOPHYSICAL SENSOR DATA

(71) Applicant: University of Maryland, College Park, College Park, MD (US)

(72) Inventors: Daniel P. Lathrop, University Park, MD (US); Heidi Myers, Greenbelt, MD (US); Vedran Lekic, Washington, DC (US)

(73) Assignee: University of Maryland, College Park, College Park, MD (US)

( * ) Notice: Subject to any disclaimer, the term of this patent is extended or adjusted under 35 U.S.C. 154(b) by 712 days.

(21) Appl. No.: 17/552,175

(22) Filed: Dec. 15, 2021

(65) Prior Publication Data

US 2024/0134085 A1    Apr. 25, 2024

Related U.S. Application Data

(60) Provisional application No. 63/126,485, filed on Dec. 16, 2020.

(51) Int. Cl.
*G01V 11/00* (2006.01)
*G06N 3/04* (2023.01)

(52) U.S. Cl.
CPC .............. *G01V 11/00* (2013.01); *G06N 3/04* (2013.01)

(58) Field of Classification Search
CPC .................................. G01V 11/00; G06N 3/04
See application file for complete search history.

(56) References Cited

U.S. PATENT DOCUMENTS

| | | | |
|---|---|---|---|
| 2019/0056231 A1* | 2/2019 | Bai | G06N 5/04 |
| 2020/0175691 A1* | 6/2020 | Zhang | G06T 7/248 |
| 2020/0353832 A1* | 11/2020 | Xiao | B60L 53/36 |
| 2021/0056778 A1* | 2/2021 | Wylie | G07C 5/0816 |

(Continued)

FOREIGN PATENT DOCUMENTS

WO    2018213399 A1    11/2018

OTHER PUBLICATIONS

Acheroy, Marc. "Mine action: status of sensor technology for close-in and remote detection of anti-personnel mines." Near Surface Geophysics 5.1 (2007): 43-55.

(Continued)

*Primary Examiner* — Ricky Go
(74) *Attorney, Agent, or Firm* — Quarles & Brady LLP; Yakov Sidorin

(57) ABSTRACT

Geophysical anomalies in an area or region can be detected, characterized, or otherwise mapped using a combination of environmental and geophysical sensor data acquired using a vehicle, which may be a remotely operated or autonomously controlled unmanned vehicle. Anomalies are detected by processing the environmental sensor data and geophysical sensor data using artificial intelligence algorithms, programs, or models. As an example, the artificial intelligence algorithms, programs, or models can include machine learning algorithms, programs, or models. The environmental sensor data are processed to generate control parameters for controlling the acquisition and/or processing of the geophysical sensor data optimized for environmental conditions in the area.

43 Claims, 11 Drawing Sheets

(56) References Cited

U.S. PATENT DOCUMENTS

| | | |
|---|---|---|
| 2021/0295144 A1 | 9/2021 | Restelli et al. |
| 2022/0057806 A1* | 2/2022 | Guo ................... G06V 20/58 |
| 2022/0179703 A1* | 6/2022 | Vincent ............... G06N 3/10 |

OTHER PUBLICATIONS

Baur et al., "Applying deep learning to automate UAV-based detection of scatterable landmines." Remote Sensing 12.5 (2020): 859. 1-16.

Bechtel et al., "Characterization of electromagnetic properties of in situ soils for the design of landmine detection sensors: Application in Donbass, Ukraine." Remote Sensing 11.10 (2019): 1232. 1-16.

Benedetto et al., "Remote sensing of soil moisture content by GPR signal processing in the frequency domain." IEEE Sensors Journal 11.10 (2011): 2432-2441.

Bruschini et al., "Ground penetrating radar and imaging metal detector for antipersonnel mine detection." Journal of Applied Geophysics 40.1-3 (1998): 59-71.

Bruschini, "A survey of research on sensor technology for landmine detection." Journal of Conventional Weapons Destruction 2.1 (1998). 1-25.

Carey et al., "Software defined radio for stepped-frequency, ground-penetrating radar." IEEE International Geoscience and Remote Sensing Symposium (IGARSS). IEEE, 2017. Software defined radio for stepped-frequency, ground-penetrating radar. International Geoscience and Remote Sensing Symposium (IGARSS), Jul. 2017, 4825-4828.

Cerquera et al. "UAV for landmine detection using SDR-based GPR technology." Robots Operating in Hazardous Environments (2017): 26-55.

Colorado et al., "An integrated aerial system for landmine detection: SDR-based Ground Penetrating Radar onboard an autonomous drone." Advanced Robotics 31.15 (2017): 791-808.

Cremer et al., "Infrared polarization measurements and modeling applied to surface-laid antipersonnel landmines." Optical Engineering 41.5 (2002): 1021-1032.

De Jong et al., "Using Polarization features of visible light for automatic landmine detection." Physics of Automatic Target Recognition. New York, NY: Springer New York, 2007. 73-90. 18 pages.

Debatty "Software defined Radar a state of the art." 2010 2nd International Workshop on Cognitive Information Processing. IEEE, 2010. 253-257.

Ganesh et al., "Surveillance drone for landmine detection." 2015 International Conference on Advanced Computing and Communications (ADCOM). IEEE, 2015. 33-38.

Garcia-Fernandez et al. "Portable and easily-deployable air-launched GPR scanner." Remote Sensing 12.11 (2020): 1833. 1-20.

Gasperikova et al., "Berkeley Uxo Discriminator (Bud)." 20th EEGS Symposium on the Application of Geophysics to Engineering and Environmental Problems. European Association of Geoscientists & Engineers, 2007. 1-9.

Gavazzi et al., "Fluxgate three-component magnetometers for cost-effective ground, UAV and airborne magnetic surveys for industrial and academic geoscience applications and comparison with current industrial standards through case studies." Geomechanics for Energy and the Environment 20 (2019): 100117. 1-11.

Geometrics, "MetalMapper 2x2 Advanced Time Domain EM UXO Sensor" (2018), 1-2.

"Giannakies et al., "A realistic FDTD numerical modeling framework of ground penetrating radar for landmine detection."" IEEE journal of selected topics in applied earth observations and remote sensing 9.1 (2015): 37-51.

Gooneratne et al., "A review of sensing technologies for landmine detection: Unmanned vehicle based approach." 2nd International Conference on Autonomous Robots and Agents. 2004. 401-407.

Groenenboom et al., "Data processing and imaging in GPR system dedicated for landmine detection." Subsurface Sensing Technologies and Applications 3 (2002): 387-402.

Grote et al., "Field-scale estimation of volumetric water content using ground-penetrating radar ground wave techniques." Water resources research 39.11 (2003). 1-14.

Jenks et al., "The use of a Software Defined Radio as an OFDM GPR." 2017 9th International Workshop on Advanced Ground Penetrating Radar (IWAGPR). IEEE, 2017. 1-4.

Kappler et al., "A hybrid method for UXO vs. non-UXO discrimination." Journal of Environmental and Engineering Geophysics 16.4 (2011): 177-189.

Kasban et al., "A comparative study of landmine detection techniques." Sensing and Imaging: An International Journal 11 (2010): 89-112.

Kaya et al., "Buried and surface mine detection from thermal image time series." IEEE Journal of Selected Topics in Applied Earth Observations and Remote Sensing 10.10 (2017): 4544-4552.

Klotzsche et al., "Measuring soil water content with ground penetrating radar: A decade of progress." Vadose Zone Journal 17.1 (2018): 1-9.

Komkov et al., "Reservoir Computing for Prediction of Beam Evolution in Particle Accelerators." NeurIPS Machine Learning for the Physical Sciences Workshop. 2019. 1-5.

Komkov et al., "Reservoir computing using networks of cmos logic gates." International Conference on Neuromorphic Systems 2021. 2021. 1-7.

Komkov et al., "RF signal classification using Boolean reservoir computing on an FPGA." 2021 International Joint Conference on Neural Networks (IJCNN). IEEE, 2021. 1-9.

Komkov et al., "The recurrent processing unit: Hardware for high speed machine learning." arXiv preprint arXiv:1912.07363 (2019). 1-5.

Lameri et al., "Landmine detection from GPR data using convolutional neural networks." 2017 25th European signal processing conference (EUSIPCO). IEEE, 2017. 538-542.

Malof, "Exploiting Multi-Look Information for Landmine Detection in Forward Looking Infrared Video" MS thesis. Duke University, 2013. 1-24.

Martinez et al., "Assessing the performance of three type of UWB antennas for FMCW GPR imaging." 2018 International Conference on Electromagnetics in Advanced Applications (ICEAA). IEEE, 2018. 620-622.

Messelink et al., "Feature-based detection of land mines in infrared images." Detection and Remediation Technologies for Mines and Minelike Targets VII. vol. 4742. SPIE, 2002.108-119.

Myers et al., "Multi-sensor integration using machine learning for UAV-based landmine detection." AGU Fall Meeting Abstracts. vol. 2019. ABSTRACT only, 1 page.

Nelson et al., "Magnetic modeling of UXO and UXO-like targets and comparison with signatures measured by MTADS." Proc. UXO Forum. 1998. 282-291.

Nelson et al., "Multisensor towed array detection system for UXO detection." IEEE Transactions on Geoscience and Remote Sensing 39.6 (2001): 1139-1145.

Ngan et al., "Development of automatic target recognition for infrared sensor-based close-range land mine detector." Detection Technologies for Mines and Minelike Targets. vol. 2496. SPIE, 1995. 881-889.

Nikulin et al., "Automated UAS aeromagnetic surveys to detect MBRL unexploded ordnance." The Journal of Conventional Weapons Destruction 24.1 (2020): 13. pp. 56-62.

Nuzzo et al., "A new densely-sampled ground penetrating radar array for landmine detection." Proceedings of the 15th International Conference on Ground Penetrating Radar. IEEE, 2014. 969-974.

Ralston et al., "Software defined radar: An open source platform for prototype GPR development." 2012 14th International Conference on Ground Penetrating Radar (GPR). IEEE, 2012.172-177.

Robledo et al., "A survey of land mine detection technology." International Journal of Remote Sensing 30.9 (2009): 2399-2410.

Schavemaker et al., "Infrared processing and sensor fusion for anti-personnel land-mine detection." Eindhoven: IEEE Student Branch, 2000. 61-71.

(56) References Cited

OTHER PUBLICATIONS

Shani et al., "Dynamics of analog logic-gate networks for machine learning." Chaos: An Interdisciplinary Journal of Nonlinear Science 29.12 (2019). 1-18.
Travassos et al., "A review of ground penetrating radar antenna design and optimization." Journal of microwaves, optoelectronics and electromagnetic applications 17 (2018): 385-402.
Ultra TEM-IV "Advanced Geophysical Classification Technology" GapEOD. (2020). UltraTEM. Retrieve on Mar. 12, 2024, from https://www.gapeod.com/ultratem/. 4 pages.
VMR3G "Minehound"—Dual-Sensor Detector. Vallon GmbH. (2023). 1-5.
Yoo et al., "Application of a drone magnetometer system to military mine detection in the demilitarized zone." Sensors 21.9 (2021): 3175. 1-15.
Zhang et al., "Compressive sensing based software defined GPR for subsurface imaging." 2021 IEEE Radar Conference (RadarConf21). IEEE, 2021.1-6.
Zhang et al., "Sensing of unexploded ordnance with magnetometer and induction data: Theory and signal processing." IEEE Transactions on Geoscience and Remote Sensing 41.5 (2003): 1005-1015.

\* cited by examiner

VEHICLE-BASED ANOMALY DETECTION USING ARTIFICIAL INTELLIGENCE AND COMBINED ENVIRONMENTAL AND GEOPHYSICAL SENSOR DATA

CROSS-REFERENCE TO RELATED APPLICATIONS

This application claims the benefit of U.S. Provisional Patent Application Ser. No. 63/126,485, filed on Dec. 16, 2020, and entitled "AERIAL VEHICLE USING ARTIFICIAL INTELLIGENCE FOR ANOMALY DETECTION," which is herein incorporated by reference in its entirety.

STATEMENT OF FEDERALLY SPONSORED RESEARCH

This invention was made with government support under IIP-2044611 and EAR1909055 awarded by the National Science Foundation. The government has certain rights in the invention.

BACKGROUND

The global unexploded ordnance (UXO) crisis is a $200 billion dollar problem that causes 15,000-20,000 deaths every year. There are approximately 110 million landmines and other UXO buried worldwide across diverse ecosystems. Currently there exists no cost-efficient, easily deployed, all-terrain, and automated approach to mine detection. Victim detonated ordnance is extremely dangerous for surface-based detection methods, especially involving the use of antiquated handheld metal detectors or probing techniques. Other ground-based systems have limitations based on environmental conditions and target material properties. While airborne landmine detection using UAVs reduces triggering events, these currently use single remote sensing methods that often yield false flags. The multi-sensor systems currently in use are land-based, limited by terrain and vegetation features, and cumbersome to transport to remote sites.

SUMMARY OF THE DISCLOSURE

The present disclosure addresses the aforementioned drawbacks by providing a method for producing a map depicting geophysical anomalies in an area based on geophysical sensor data. The method includes accessing environmental sensor data with a computer system, the environmental sensor data being indicative of environmental conditions in an area. A first machine learning algorithm is also accessed with the computer system, where the first machine learning algorithm has been trained (e.g., pre-trained) on first training data to determine confidence weights from environmental conditions. Confidence weight values can be generated by applying the environmental sensor data to the first machine learning algorithm, outputting the confidence weight values. Geophysical sensor data are also accessed with a computer system, the geophysical sensor data being indicative of data acquired from the area using a plurality of different geophysical sensors. A second machine learning algorithm is also accessed with the computer system, where the second machine learning algorithm has been trained (e.g., pre-trained) on second training data to identify anomalies in an area from geophysical sensor data acquired from that area. Anomaly map data are generated by applying the geophysical sensor data and the confidence weight values to the second machine learning algorithm, using the confidence weight values as an additional input to the second machine learning algorithm to control the contributions of different ones of the geophysical sensor data when generating the anomaly map data, generating output as the anomaly map data. The anomaly map data are presented or otherwise provided to a user, where the anomaly map data may include an anomaly map depicting at least one anomaly in the area, or otherwise indicating that no anomalies are present.

Another general aspect of the present disclosure includes a method for generating an anomaly map depicting geophysical anomalies in an area. This method includes acquiring environmental sensor data using environmental sensors coupled to a vehicle and processing the environmental sensor data using an electronic processor housed on the vehicle to generate geophysical sensing control parameter data for controlling a geophysical sensing mode of the vehicle. Geophysical sensor data are then acquired using geophysical sensors coupled to the vehicle while in the geophysical sensing mode, and the geophysical sensor data are processed using the electronic processor to generate an anomaly map that depicts at least one anomaly within the area, or otherwise indicating that no anomalies are present.

It is another general aspect of the present disclosure to provide a vehicle-based system for mapping geophysical anomalies within an area. The vehicle-based system includes a vehicle; a plurality of environmental sensors coupled to the vehicle; a plurality of geophysical sensors coupled to the vehicle; and an electronic processor housed within the vehicle and in communication with the plurality of environmental sensors and the plurality of geophysical sensors. The electronic processor is configured to acquire environmental sensor data with the plurality of environmental sensors; acquire geophysical sensor data with the plurality of geophysical sensors; and generate an anomaly map that depicts at least one anomaly within an area (or otherwise indicating that no anomalies are present) using the environmental sensor data and the geophysical sensor data.

The foregoing and other aspects and advantages of the present disclosure will appear from the following description. In the description, reference is made to the accompanying drawings that form a part hereof, and in which there is shown by way of illustration one or more embodiments. These embodiments do not necessarily represent the full scope of the present disclosure, however, and reference is therefore made to the claims and herein for interpreting the scope of the present disclosure.

DETAILED DESCRIPTION

Figure 1:
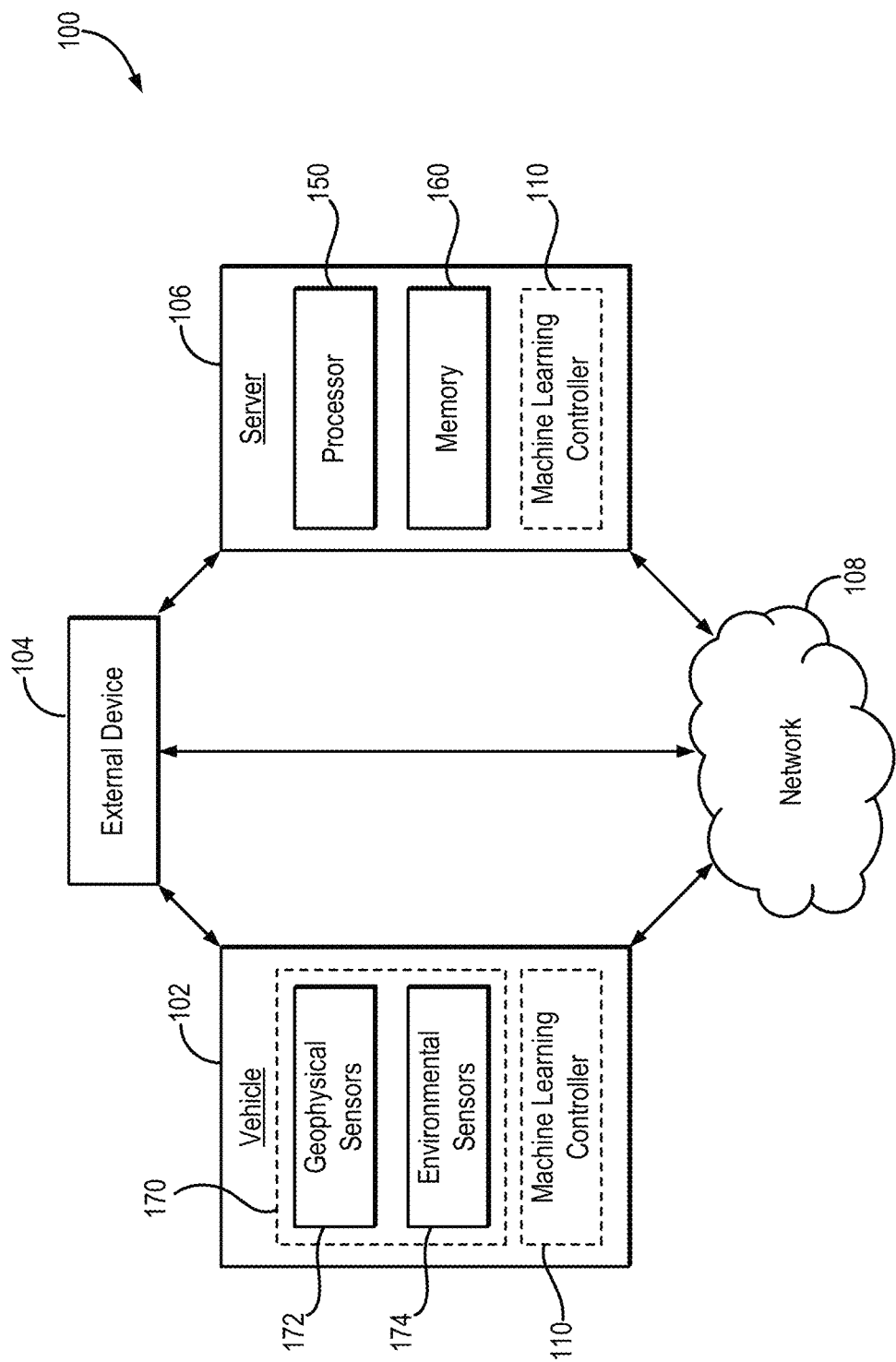
FIG. 1 shows an example vehicle-based anomaly detection and/or mapping system in accordance with some embodiments described in the present disclosure.

Described here are systems and methods for detecting anomalies in an area or region from which various sensor data (e.g., environmental sensor data and geophysical sensor data) have been acquired using a vehicle, which may be a remotely operated or autonomously controlled unmanned vehicle. One or more anomalies in the area or region are detected by processing the environmental sensor data and geophysical sensor data using artificial intelligence algorithms, programs, or models. As an example, the artificial intelligence algorithms, programs, or models can include machine learning algorithms, programs, or models.

Environmental sensor data are acquired by environmental sensors coupled to the vehicle, and these environmental sensor data are input to a first machine learning algorithm, generating output as control parameters for controlling or adjusting the model parameters of a second machine learning algorithm (e.g., confidence weights for hidden layers in a neural network), or for controlling operation of the vehicle. As one example, the control parameters can indicate which combination of geophysical sensors to use based on the environmental conditions in the area or region, as measured by the environmental sensors. Additionally or alternatively, the control parameters can indicate confidence weighting values for hidden layers in a second machine learning algorithm that is trained to take input as geophysical sensor data and generate output as an anomaly map that depicts anomalies detected within the area or region.

According to some embodiments described in the present disclosure, the sensor-fused payload of the vehicle can provide improved geophysical sensing of the near-surface (e.g., 0-2 meters) by providing a method for quickly evaluating which set of instruments will yield the most accurate inversion (i.e., a geophysics technique to image the subsurface using sensor-collected information for earth materials) and producing a composite inversion of a field area, utilizing machine learning algorithms, such as those that implement deep learning.

A common shortcoming of geophysical methods for inferring subsurface properties is that, when used in isolation, they yield non-unique solutions. Magnetometer data, for example, are inherently consistent with an infinite number of possible subsurface structures due to the integral equations of dipolar magnetism. By integrating constraints from multiple, complementary geophysical instruments, this non-uniqueness can be reduced and the confidence on inference increased, which can help processing techniques be fine-tuned.

The systems and methods described in the present disclosure use multiple machine learning algorithms, as described above, to bridge the gap of geophysical sensor data collection and inversions in a modern and use-adaptable way. Advantageously, the anomaly maps generated using the techniques described in the present disclosure better differentiate which geologic and man-made materials are present in the subsurface, especially where ground-based fieldwork is hazardous or impractical. As such, the systems and methods can be used in a variety of different geophysical sensing applications.

In general, the systems and methods can be used to identify objects that humans have buried and forgotten, whether those objects are explosive remnants from prior conflicts, lost artifacts from prior civilizations, or discarded (waste) materials. Advantageously, the systems and methods are capable of identifying items in the subsurface that may have a direct negative impact on the environment as they degrade over time. Additionally or alternatively, the systems and methods can be used to detect naturally occurring geophysical anomalies, such as mineral deposits, fossil fuel reserves, lava tubes, caves, hydrologic resources, and the like. For example, the systems and methods described in the present disclosure can be used in non-munitions related geophysical exploration, including in critical zone science, as well as geotechnical and archeological contexts. The suite of geophysical instrumentation chosen can be configured to look for other subsurface areas of interest, such as mineral deposit locations and lava tubes. For aerial vehicle-based systems, a long flying time for the platform can allow for mapping and measuring magnetic anomalies and changes in topography in remote areas. The system could also be flown in an area with active volcanoes to inform hazards-mapping personnel of small-scale changes that may not be resolved using satellite data.

In some embodiments, the systems and methods described in the present disclosure may be used to detect landmines and other unexploded ordnance ("UXO"). Additionally or alternatively, the systems and methods described in the present disclosure may be used to detect or characterize other anomalies or features, including geological and/or geophysical features (e.g., mineral deposits, fossil fuel reserves, lava tubes, caves, hydrologic resources) for use in geological or geophysical applications; to detect or characterize utilities and other civil service structures or features for use in civil engineering and/or surveying applications; to detect or characterize archaeological features (e.g., buried archaeological sites, artifacts, etc.) for use in archaeological applications; and the like.

As such, anomalies that can be detected or characterized using the systems and methods described in the present disclosure can include, among others, UXOs, buried electrical utilities, buried gas utilities, buried water utilities, service tunnels, buried tanks or containers (e.g., hazardous waste containers, fuel containers, etc.), mineral deposits, fossil fuel deposits, lava tubes, caves, underground water features or hydrologic resources, archaeological sites (e.g., buried ruins, artifacts, or the like), and so on.

In certain embodiments, the systems and methods described in the present disclosure implement a vehicle-based geophysical sensor system for detecting, characterizing, and mapping anomalies in an area or region. The vehicle can include multiple sensor subsystems (e.g., environmental sensors, geophysical sensors, combinations thereof), which may work together via a central control system to optimize detection and/or characterization of anomalies as described above. For example, the vehicle may utilize cameras, forward-looking infrared ("FLIR") cameras, and other optical sensors; fluxgate magnetometers and other magnetometer technologies (e.g., excitation coils and sensing coils); ground penetrating radar ("GPR"); light detection and ranging ("LiDAR"); environmental sensors; among others. In certain embodiments, the central control system may utilize machine learning to better process the various data collected by the sensor subsystems, as described above. In certain embodiments, the anomaly detection and/or characterization may be performed autonomously and provide alerts to a human pilot or may directly influence the vehicle's autonomous control system.

As one non-limiting example, the vehicle-based geophysical sensor system can include an aerial vehicle, such as an unmanned aerial vehicle ("UAV") with an integrated multi-sensor package. The UAV may include a quad-copter, a drone, or the like. The UAV-based system uses machine learning to evaluate environmental conditions (e.g., weather and terrain), and from those data determines the optimal blend of geophysical sensor data from on-board instruments that will yield the most accurate anomaly detection and/or characterization results, such as the most accurate UXO detection results. The UAV-based system performs an initial aerial survey to measure environmental conditions, such as humidity, temperature, vegetation density, albedo, and soil moisture content in the targeted area or region using suitable environmental sensor types.

One or more machine learning algorithms (which may be local to the UAV or remote to the UAV) can be used to process the environmental sensor data to determine the optimal weighted combination of equipped sensing methods that is most likely to yield accurate results. The optimal weighted combination may, for example, be determined based on recorded or simulated data under various environmental and geophysical conditions, previous surveys, and one or more trained neural network or other machine learning data repositories. The UAV-based system can then switch from an environmental evaluation and/or sensing mode to an anomaly (e.g., UXO) detection mode and perform a second sweep of the same area. The acquired data (e.g., geophysical sensor data) from the chosen remote sensing instrument(s) can be preferentially weighted and processed on the UAV to generate output as probable anomaly detection results that can be wirelessly communicated back to a remote user station. Additionally or alternatively, the acquired data can be wirelessly transmitted back to the remote user station where they are processed instead of being processed on the UAV.

Thus, in some embodiments, the presently disclosed system and methods seek to address concerns raised by existing technologies for identifying UXOs and landmines for humanitarian, civilian, and military applications. In these instances, the geophysical sensor-fused, non-invasive, airborne platform may be referred to as an AVAILD (Aerial Vehicle using Artificial Intelligence for Landmine Detection) system. Combining environmental sensors with GPR, IR, optical, LiDAR, and one or more 3-component magnetometers as an integrated sensor package, the aerial platform can fly 1-3 meters above ground and leverage machine learning techniques with onboard computing to produce rapid-response information about detected munitions in a field area.

The drone-based, sensor-fused approach provides increased detection and/or characterization confidence while effectively minimizing the threat of accidental detonation from false negatives or from invasive land-based mine detection techniques. By remotely detecting where UXO are buried with high confidence in diverse environments, the AVAILD system can enable efficient demining, potentially saving thousands of lives each year, reducing the cost of geophysical munitions surveying, and increasing the speed of UXO remediation.

The systems and methods described in the present disclosure are capable of overcoming the drawbacks of previous UXO detection systems by using a multidisciplinary approach to near-subsurface UXO (or other anomaly) detection and/or characterization, and by using the integration of environmental sensors as a weight-optimizing agent for the geophysical sensors. Land-based multi-sensor systems currently available rely on performing multiple analyses for each sensor. On the other hand, the systems and methods described in the present disclosure integrate the sensor results into a single, comprehensive inversion from data-fusion, tailored to the environmental conditions of the survey area.

Advantageously, the disclosed systems and methods provide the ability to optimally combine constraints from multiple geophysical and environmental sensors on a single vehicular (e.g., aerial) platform. In order for a survey team to produce comparable information about magnetics, ground penetrating radar reflections, FLIR optics, and LiDAR information for a field area using currently available instrumentation, four separate surveys would be required, and each survey would need extensive post-processing to invert for subsurface properties. The systems and methods described in the present disclosure allow for simultaneous surveying by a suite of complementary geophysical sensors, while machine learning capabilities tune the inversion based on environmental conditions and reduce the time needed for making subsurface inferences. As a result, the disclosed systems and methods provide the ability for end-users to save significant time and money when conducting munitions response or other geophysical surveys.

FIG. 1 illustrates an example vehicle-based anomaly mapping system 100. The vehicle-based anomaly mapping system 100 includes a vehicle 102, an external device 104, a server 106, and a network 108. The vehicle 102 includes a sensor system 120 containing various sensors (e.g., environmental sensors and geophysical sensors) and devices that collect environmental sensor data, geophysical sensor data, and other measurement data from an area or region within which the vehicle 102 is operated.

As described above, the vehicle 102 is configured to use artificial intelligence (e.g., machine learning) for geophysical detection and/or characterization of anomalies, which may include UXO detection, geophysical detection, civil engineering site mapping, geophysics exploration (e.g., lava tube mapping, cave mapping, mineral resource mapping and identification, hydrologic resource tracking), and the like. The sensor system 120 of the vehicle 102 includes environmental sensors 122 and geophysical sensors 124. As described below in more detail, the vehicle-based anomaly mapping system 100 also includes data workflow components, data analytics components, hardware data bus(es), components for implementing software fusion of data, and controls subsystems. The environmental and geophysical sensor data are collectively used to generate an anomaly map that depicts anomalies within the mapped area or region. For instance, the anomaly map may be a high-dimensional map having the ability to mark UXO or other geophysical anomalies.

In certain embodiments, the vehicle 102 is an aerial vehicle. For example, the vehicle 102 may be an unmanned aerial vehicle ("UAV"). As another example, the vehicle 102 may be an unmanned ground vehicle ("UGV"), an unmanned underwater vehicle ("UUV"), or the like. In certain embodiments, the vehicle 102 may be autonomously controlled. In still other embodiments, the vehicle 102 can be a truck, a car, a tank, a hand-pushed cart, a trailer pulled by another vehicle, a non-ferromagnetic trailer pulled by another vehicle (e.g., a trailer fabricated from non-ferromagnetic materials), a non-metallic trailer pulled by another vehicle (e.g., a trailer fabricated from non-metallic materials), other aircraft, and spacecraft. When the vehicle 102 is a spacecraft, the vehicle-based anomaly mapping system 100 can be used on other planetary bodies including but not limited to asteroids, moons, and planets.

In the illustrated embodiment, the vehicle 102 communicates with the external device 104. The external device 104 may include, for example, a smartphone, a tablet computer, a cellular phone, a laptop computer, a smart watch, and the like. The vehicle 102 communicates with the external device 104, for example, to transmit at least a portion of the environmental sensor data, geophysical sensor data, or other measurement data or output data; to receive configuration information for the vehicle 102, machine learning control(s) or related parameters for processing data onboard the vehicle 102; or a combination thereof. In some embodiments, the external device 104 may include a short-range transceiver to communicate with the vehicle 102, and a long-range transceiver to communicate with the server 106. In the illustrated embodiment, the vehicle 102 also includes a transceiver to communicate with the external device 104 via, for example, a short-range communication protocol such as Bluetooth®, analog or digital modes of very high frequency ("VHF"), analog or digital modes of ultra high frequency ("UHF"), IEEE 802.11, and the like. In some embodiments, the external device 104 bridges the communication between the vehicle 102 and the server 106. That is, the vehicle 102 transmits data (e.g., environmental sensor data, geophysical sensor data) to the external device 104, and the external device 104 forwards the data from the vehicle 102 to the server 106 over the network 108.

The server 106 includes a server electronic control assembly having a server electronic processor 150, a server memory 160, and a transceiver. In some embodiments, the server 106 may also include a dedicated machine learning controller. Alternatively, the electronic processor 150 can be configured to implement a machine learning control.

The transceiver allows the server 106 to communicate with the vehicle 102, the external device 104, or both. The server electronic processor 150 receives environmental sensor data, geophysical sensor data, and/or other measurement data from the vehicle 102 (e.g., via the external device 104, via one or more sensors, or the like), stores the received data in the server memory 160, and, in some embodiments, uses the received data for constructing, training, or adjusting a machine learning control. Additionally or alternatively, the server electronic processor 150 can apply the received data to a machine learning control (e.g., a machine learning algorithm, program, or model) to generate anomaly maps or other feature data, as described in more detail below.

The server 106 may maintain a database (e.g., on the server memory 160) for containing environmental sensor data, geophysical sensor data trained machine learning controls (e.g., trained machine learning algorithms, programs, and/or models) artificial intelligence controls (e.g., rules and/or other control logic implemented in an artificial intelligence model and/or algorithm), and the like.

Although illustrated as a single device, the server 106 may be a distributed device in which the server electronic processor 150 and server memory 160 are distributed among two or more units that are communicatively coupled (e.g., via the network 108).

The network 108 may be a long-range wireless network such as the Internet, a local area network ("LAN"), a wide area network ("WAN"), or a combination thereof. In other embodiments, the network 108 may be a short-range wireless communication network, and in yet other embodiments, the network 108 may be a wired network using, for example, USB cables. In some embodiments, the network 108 may include both wired and wireless devices and connections. Similarly, the server 106 may transmit information to the external device 104 to be forwarded to the vehicle 102. In some embodiments, the vehicle 102 bypasses the external device 104 to access the network 108 and communicate with the server 106 via the network 108. In some embodiments, the vehicle 102 is equipped with a long-range transceiver instead of or in addition to the short-range transceiver. In such embodiments, the vehicle 102 communicates directly with the server 106 or with the server 106 via the network 108 (in either case, bypassing the external device 104).

In some embodiments, the vehicle 102 may communicate directly with both the server 106 and the external device 104. In such embodiments, the external device 104 may, for example, generate a graphical user interface to facilitate control and programming of the vehicle 102, while the server 106 may store and analyze larger amounts of data (e.g., environmental sensor data, geophysical sensor data) for future processing or analysis of the environmental and/or geophysical sensor data to detect anomalies in the area or region from which the data were acquired. In other embodiments, however, the vehicle 102 may communicate directly with the server 106 without utilizing a short-range communication protocol with the external device 104.

As described above, in some embodiments, the vehicle 102 may include a machine learning controller 110, which may be a dedicated (i.e., standalone) machine learning controller or may be an electronic controller or processor of the vehicle 102 that is configured to implement a machine learning control in addition to other functions. Additionally or alternatively, the server 106 may include a machine learning controller 110, which may be a dedicated machine learning controller or a server electronic processor 150 that is configured to implement a machine learning control. In still other embodiments, the external device 104 can include a machine learning controller, whether a dedicated machine learning controller or other electronic processor that is configured to implement a machine learning control.

In some implementations, the machine learning controller 110 (whether located on the vehicle 102, the server 106, or the external device 104) is configured to construct a model (e.g., building one or more algorithms) based on example inputs, which may be done using supervised learning, unsupervised learning, self-supervised learning, reinforcement learning, ensemble learning, active learning, transfer learning, or other suitable learning techniques for machine learning programs, algorithms, or models. Additionally or alternatively, the machine learning controller can be configured to modify a machine learning program, algorithm, or model (e.g., by changing its hyperparameters); to active and/or deactivate a machine learning program, algorithm, or model; to switch between different machine learning programs, algorithms, or models; and/or to change output thresholds for a machine learning program, algorithms, or model.

The machine learning controller 110 may be configured to implement various different types of machine learning algorithms or models. For example, the machine learning controller may implement decision tree learning, association rule learning, artificial neural networks, recurrent neural networks, long short-term memory ("LSTM") models, inductive logic programming, support vector machines, clustering, Bayesian networks, reinforcement learning, manifold learning, representation learning, similarity and metric learning, sparse dictionary learning, genetic algorithms, k-nearest neighbors ("KNN") classifiers, among others.

As one non-limiting example, supervised and unsupervised deep learning paradigms can be evaluated against one another to distinguish relevant environmental conditions. Auto-encoder algorithms can be used in conjunction with multiple neural network designs and other dimensionality reduction methods to find a combination of supervised and unsupervised learning. Auto-encoders are feedforward, unsupervised and contain an encoder, a code, and a decoder. The encoder compresses the input to produce the middle code, after which the decoder reconstructs the input using only the middle code.

A multi-layer perceptron ("MLP"), a supervised technique, can be used as a labelling and binning algorithm, as well as convolutional neural networks ("CNNs") with different numbers of hidden layers and weighting values. The output of deep learning processes operating on environmental sensor data is a combination of weights that can then be used for the hidden layers of a geophysical sensor neural network.

Auto-encoders, CNNs, and recursive neural networks ("RNNs") can be evaluated against one another when designing or otherwise selecting the geophysical sensor algorithm(s). Using information from the environmental sensor deep learning results, the neural network will adjust the weights and biases accordingly and use that information to perform the data assimilation calculations. Fine-tuning the hyperparameters of the CNNs and RNNs can include adding or subtracting hidden layers and pooling layers until a maximum accuracy percentage is achieved. Each survey result thereafter can be incorporated in the algorithm to build a robust repository upon which the network will update (e.g., by storing data in a database using the server 106, by storing data or updated model parameters in the memory of the vehicle 102, external device 104, and/or server 106), allowing for stronger generalization capability.

Figure 14:
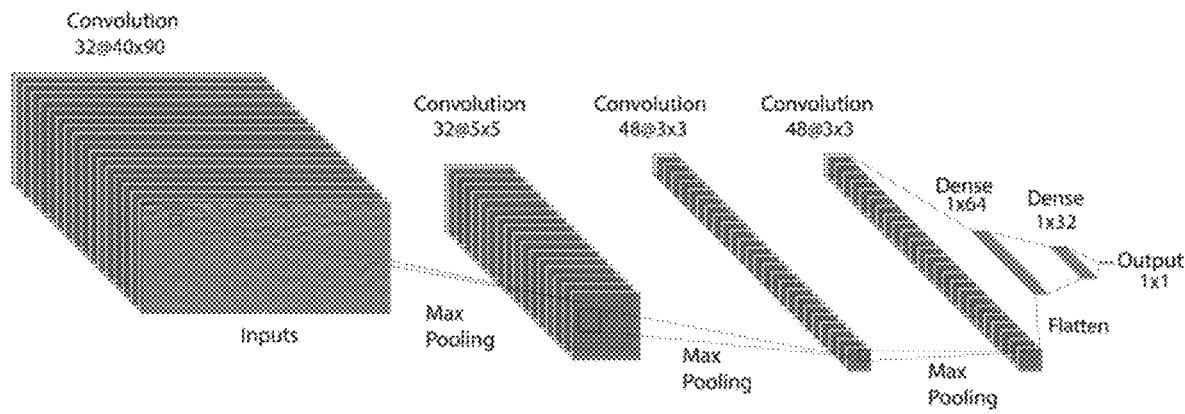
FIG. 14 is an example convolutional neural network that can be implemented in some embodiments of the present disclosure.
Figure 15:
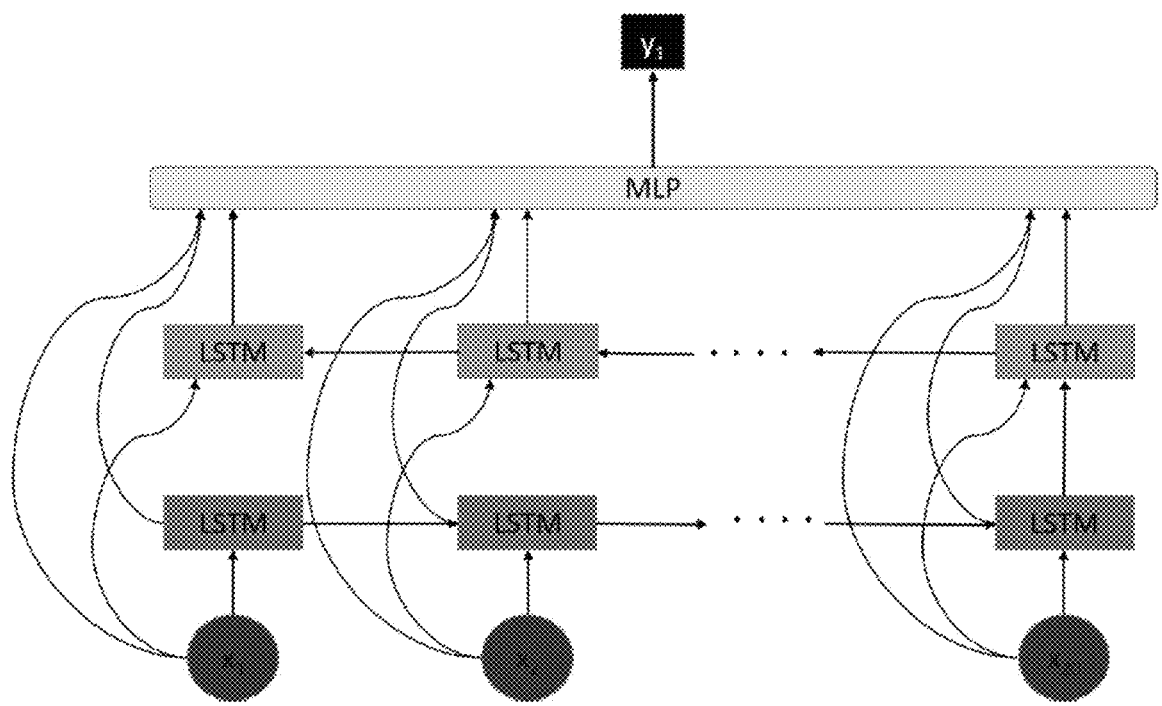
FIG. 15 is an example of a long short-term memory network that can be implemented in some embodiments of the present disclosure.

An example CNN that can be implemented in some embodiments of the present disclosure is shown in FIG. 14, and an example LSTM network that can be implemented in some embodiments of the present disclosure is shown in FIG. 15.

Each set of candidate algorithms from the environmental and geophysical sensor networks can contribute to a combination inversion of weighted data to determine the locations and characteristics of potential anomalies in the area or region from which data were acquired. A data-fused and automated inversion graphical user interface ("GUI") can be implemented to produce a simplified map of the field area, which highlights areas where anomalies are located, color-coding the results based on the calculated probability of positive discovery or other inferred attribute. Other examples of anomaly maps that can be generated are described below in more detail. The results of anomaly detection can be transmitted wirelessly to the external device 104 and/or server 106 (e.g., a remote user station) once the vehicle 102 is in communications range.

The vehicle-based anomaly mapping system 100 includes a system of communications and controls. As one example, the vehicle-based anomaly mapping system 100 can include a base station that can function to control the vehicle 102 and can receive sensor data and analyze map data back from the vehicle 102. For instance, the base station can be implemented as the external device 104, server 106, or both. The communication between base stations and vehicles use techniques including, but not limited to, digital radio, analog radio, radio rangefinding, infrared optical communications, visible optical communications, laser communications, and microwave communications. These communications can be facilitated using the network 108, or can be made directly between the vehicle 102 and base station(s) (e.g., external device(s) 104, server(s) 106).

As a non-limiting example, the communications and controls may be used in GPS-contested locations to determine the vehicle location during mapping. That location determination can use measurements including but not limited to radio distance from the base station, radio distance from one, two, or three base station antennas separated for triangulation, LIDAR, radar, accelerometers on the vehicle, and so on. These data types may be used in location determination in conjunction with known site map types.

Figure 2:
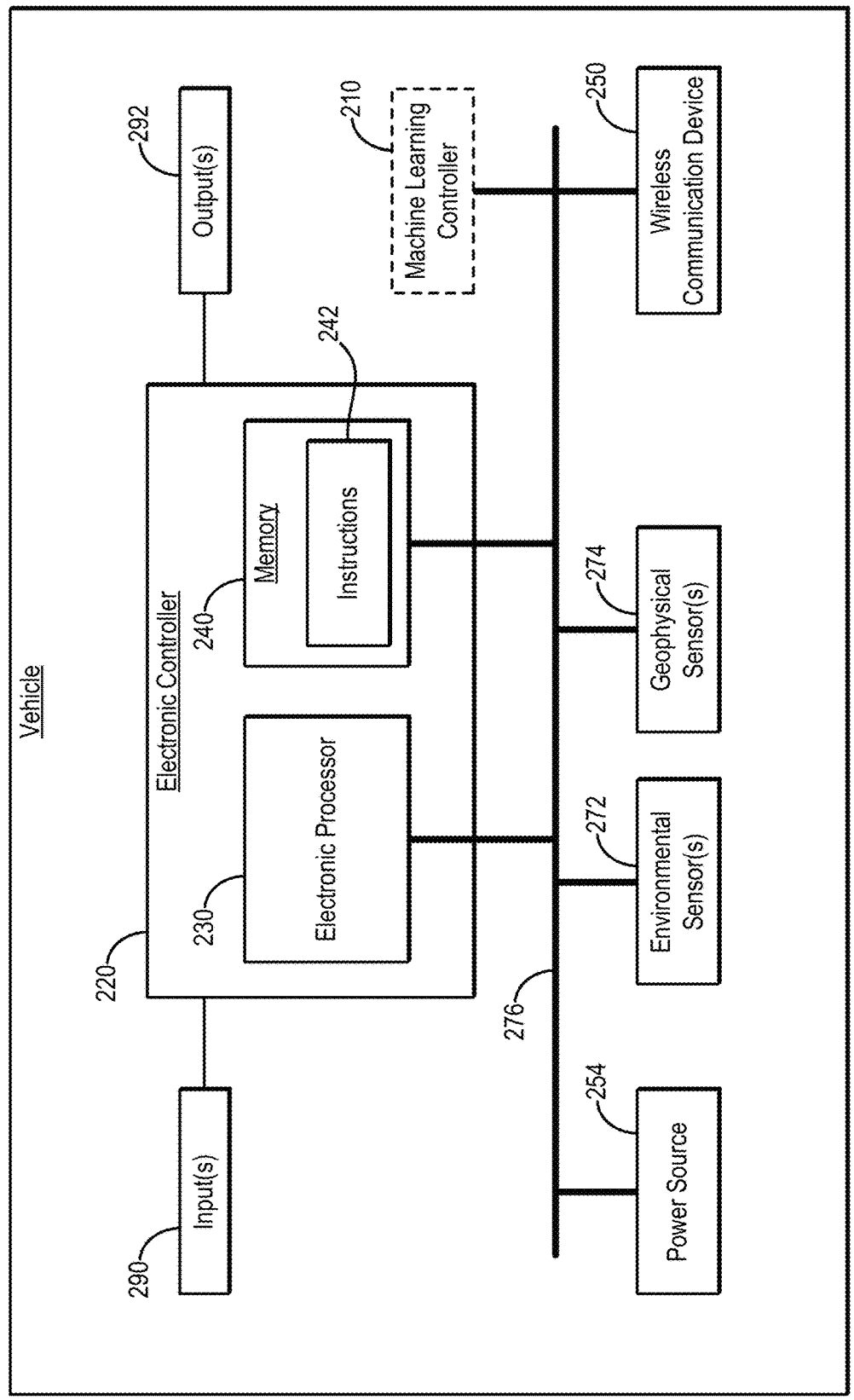
FIG. 2 is a block diagram of an example vehicle that can be implemented in the vehicle-based anomaly detection and/or mapping system.

FIG. 2 is a block diagram of a representative vehicle 102 for use in a vehicle-based anomaly mapping system 100 in accordance with some embodiments described in the present disclosure. Although the vehicle-based anomaly mapping system 100 is described as being in communication with an external device 104 or with a server 106, in some embodiments, the vehicle 102 used in the vehicle-based anomaly mapping system 100 is self-contained or closed, in terms of machine learning, and does not need to communicate with an external device 104, a server, or any other external system device to perform the functionality of the machine learning controller 110 described in more detail below.

As shown in FIG. 2, the example vehicle 102 that can be used in the vehicle-based anomaly mapping system 100 includes an electronic controller 220, a wireless communication device 250, a power source 254, one or more environmental sensors 272, one or more geophysical sensors 274, an optional dedicated machine learning controller 210, etc.

The electronic controller 220 can include an electronic processor 230 and memory 240. The electronic processor 230, the memory 240, and the wireless communication device 250 can communicate over one or more control buses, data buses, etc., which can include a device communication bus 276. The control and/or data buses are shown generally in FIG. 2 for illustrative purposes. The use of one or more control and/or data buses for the interconnection between and communication among the various modules, circuits, and components would be known to a person skilled in the art.

The electronic processor 230 can be configured to communicate with the memory 240 to store data and retrieve stored data. The electronic processor 230 can be configured to receive instructions and data from the memory 240 and execute, among other things, the instructions. In particular, the electronic processor 230 executes instructions stored in the memory 240. Thus, the electronic controller 220 coupled with the electronic processor 230 and the memory 240 can be configured to perform the methods described herein (e.g., the method 700 of FIG. 7; the method 800 of FIG. 8; the method 900 of FIG. 9; the method 1000 of FIG. 10; and/or the method 1100 of FIG. 11).

The memory 240 can include read-only memory ("ROM"), random access memory ("RAM"), other non-transitory computer-readable media, or a combination thereof. The memory 240 can include instructions 242 for the electronic processor 230 to execute. The instructions 242 can include software executable by the electronic processor 230 to enable the electronic controller 220 to, among other things, control operation of the vehicle 102, control operation of the environmental sensor(s) 272 to acquire environmental sensor data, control operation of the geophysical sensor(s) 274 to acquire geophysical sensor data, process the environmental sensor data to determine control parameters (e.g., vehicle control parameters, geophysical sensor control parameters, machine learning model parameters for controlling the contribution of different geophysical sensor types to the anomaly detection task), process the geophysical sensor data to generate anomaly map data, and the like. The software can include, for example, firmware, one or more applications, program data, filters, rules, one or more program modules, and other executable instructions. In some embodiments, the machine learning controller 210 may be stored in the memory 240 of the electronic controller 220 and can be executed by the electronic processor 230.

The electronic processor 230 is configured to retrieve from memory 240 and execute, among other things, instructions related to the control processes and methods described herein. The electronic processor 230 is also configured to store data on the memory 240 including environmental sensor data (e.g., soil moisture data, soil temperature data, air moisture data, air temperature data, albedo), geophysical sensor data (e.g., GPR data, accelerometer data, magnetometer data, NMR data, X-ray spectral data, optical spectral data, hyperspectral data, optical instrumentation data), location data, and the like.

In some embodiments, the memory 240 may include a machine learning control that, when acted upon by the electronic processor 230, enables the electronic controller 220 to function as a machine learning controller, such as machine learning controller 210. In these instances, the vehicle 102 may not include a separate machine learning controller 210, but may instead have an electronic controller 220 that is configured to function as a machine learning controller. Additionally or alternatively, the memory 240 may include a machine learning control that is accessible by the separate machine learning controller 210.

In some other embodiments, the memory 240 may include an artificial intelligence control that, when acted upon by the electronic processor 230, enables the electronic controller 220 to function as an artificial intelligence controller. The artificial intelligence control may include instructions for implementing one or more artificial intelligence programs, algorithms, or models such as an expert system, a rules engine, a symbolic logic, one or more knowledge graphs, and so on.

The wireless communication device 250 is coupled to the electronic controller 220 (e.g., via the device communication bus 276). The wireless communication device 250 may include, for example, a radio transceiver and antenna, a memory, and an electronic processor. In some examples, the wireless communication device 250 can further include a GNSS receiver configured to receive signals from GNSS satellites, land-based transmitters, etc. The radio transceiver and antenna operate together to send and receive wireless messages to and from the external device 104, a server 106, and/or the electronic processor of the wireless communication device 250. The memory of the wireless communication device 250 stores instructions to be implemented by the electronic processor and/or may store data related to communications between the vehicle 102 and the external device 104 and/or a server 106.

The electronic processor for the wireless communication device 250 controls wireless communications between the vehicle 102 and the external device 104 and/or a server 106. For example, the electronic processor of the wireless communication device 250 buffers incoming and/or outgoing data, communicates with the electronic processor 230 and/or machine learning controller 210, and determines the communication protocol and/or settings to use in wireless communications.

In some embodiments, the wireless communication device 250 is a Bluetooth® controller. The Bluetooth® controller communicates with the external device 104, and/or server 106 employing the Bluetooth® protocol. Additionally or alternatively, the wireless communication device 250 can include a VHF controller, which may implement analog or digital modes of VHF communication, or a UHF controller, which may implement analog or digital modes of UHF communications. In such embodiments, therefore, the vehicle 102 will be within communication range (e.g., proximity) of a remote user station (e.g., external device 104 and/or server 106) while they exchange data. In other embodiments, the wireless communication device 250 communicates using other protocols (e.g., VHF, UHF, Wi-Fi®, cellular protocols, a proprietary protocol, etc.) over a different type of wireless network. For example, the wireless communication device 250 may be configured to communicate via WiFi® signals through a wide area network such as the Internet or a local area network, or to communicate through a piconet (e.g., using infrared or NFC communications). In still other embodiments, the wireless communication device 250 may be configured to communicate using other wireless communication technologies, such as digital radio, analog radio, radio rangefinding, infrared optical communications, visible optical communications, laser communications, and microwave communications. The communication via the wireless communication device 250 may be encrypted to protect the data exchanged between the vehicle 102 and the external device 104 and/or server 106 from third parties.

The wireless communication device 250, in some embodiments, exports environmental sensor data, geophysical sensor data, location data, anomaly map(s) and the like from the vehicle 102 (e.g., from the electronic processor 230). In these and other instances, the server 106 can receive the exported data, either directly from the wireless communication device 250 or through an external device 104, and logs the data received from the vehicle 102. Additionally or alternatively, the external device 104 can receive and log the data received from the vehicle 102.

In some embodiments, the exported data can be used by the vehicle 102, the external device 104, and/or the server 106 to train or adapt a machine learning controller relevant to similar vehicle-based geophysical sensor systems. The wireless communication device 250 may also receive information from the server 106 and/or the external device 104, such as time and date data (e.g., real-time clock data, the current date), configuration data, mode configurations, programming for the vehicle 102, updated machine learning controllers for the vehicle-based anomaly mapping system 100, and the like.

In some embodiments, the power source 254 can be a battery or other direct current ("DC") power source, such as a photovoltaic cell (e.g., a solar panel). As another example, the power source 254 can include hydrogen cell conversion units (e.g., dual hydrogen cell conversion units). As described above, employing hydrogen cells allows for the vehicle 102 to travel significantly longer than other vehicle-based geophysical instruments (e.g., on the order of hours) depending on the payload weight. The vehicle 102 distributes the power from the power source 254 (i.e., battery) to provide power to one or more components of the vehicle-based anomaly mapping system 100.

The machine learning controller 210 includes an electronic processor and a memory. The memory of the machine learning controller 210 stores a machine learning control, which may also be referred to as machine learning control instructions. The machine learning control may include a trained machine learning program, algorithm, or model. In one example embodiment, the electronic processor of the machine learning controller 210 includes a graphics processing unit.

In some embodiments, the machine learning controller 210 is positioned on a separate printed circuit board ("PCB") as the electronic controller 220 of the vehicle 102. The PCB of the electronic controller 220 and the machine learning controller 210 are coupled with, for example, wires or cables to enable the electronic controller 220 of the vehicle 102 to, in some embodiments, control operation of the vehicle 102 and/or geophysical sensors 274 based on the outputs and determinations from the machine learning controller 210.

In other embodiments, however, the machine learning control may be stored in memory 240 of the electronic controller 220 and may be implemented by the electronic processor 230 of the vehicle 102. In yet other embodiments, the machine learning controller 210 is implemented in the separate electronic processor, but is positioned on the same PCB as the electronic controller 220 of the vehicle 102. Embodiments with the machine learning controller 210 implemented as a separate processing unit from the electronic controller 220, whether on the same or different PCBs, allows selecting a processing unit to implement each of the machine learning controller 210 and the electronic controller 220 that has its capabilities (e.g., processing power and memory capacity) tailored to the particular demands of each unit. Such tailoring can reduce costs and improve efficiencies of the vehicle 102.

As discussed above, the machine learning control may be constructed, trained, and/or operated by the server 106. In other embodiments, the machine learning control may be constructed and/or trained by the server 106, but implemented by the vehicle 102, and in yet other embodiments, the vehicle 102 (e.g., the electronic controller 220, electronic processor of the machine learning controller 210, or a combination thereof) constructs, trains, and/or implements the machine learning control.

As an example, the vehicle 102 can be equipped with various types of environmental sensors 272. The environmental sensors 272 can be used to measure environmental conditions within the area or region being mapped. For example, the environmental sensors 272 can be used to acquire environmental sensor data indicative of environmental conditions such as weather, terrain, etc. The environmental sensor data may include measurements of humidity, temperature, vegetation density, albedo, soil moisture content, and so on.

Figure 3:
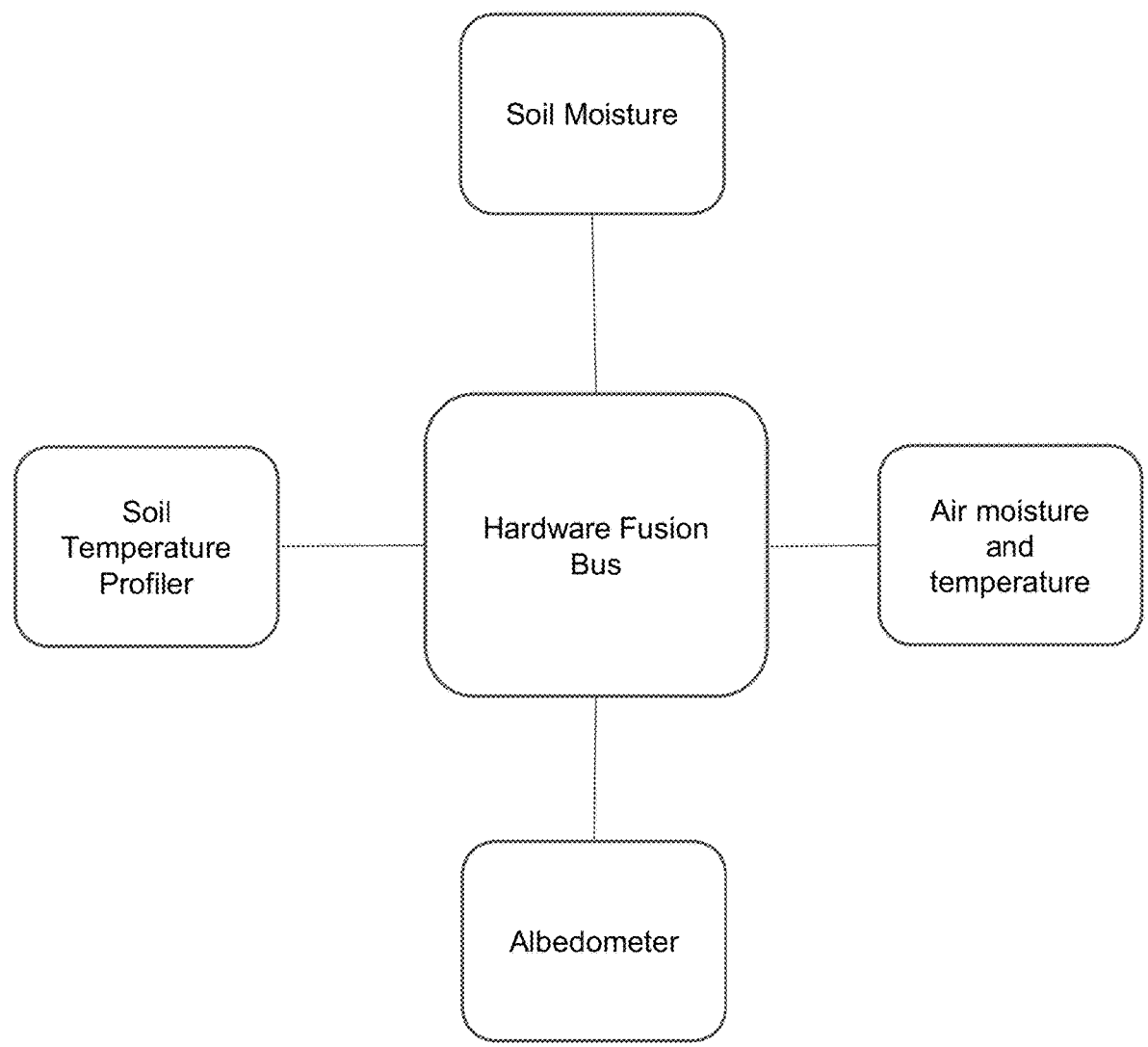
FIG. 3 is a schematic illustration of an example hardware fusion of environmental sensor data.

As illustrated in FIG. 3, the environmental sensors 272 can be integrated using a hardware fusion bus (e.g., an ethernet bus, a serial bus, an RS-232 bus, an RS-485 bus, an MOD bus, a general purpose interface bus ("GPM"), IEEE 803.11, IEEE 802.15, and the like), which in some instances may be implemented using microcontroller technology. To integrate all sensor electronics, microcontrollers and other related hardware can be used to handle power consumption across each sensor instrument. Data output from each environmental sensor 272 can be converted into a single format to perform a composite inversion for the survey area. The single data output format can be based on each sensor's electrical and signal output design, and can be used to leverage electronics integration best practices to synchronize all data toward a multi-sensor package that will be equipped on the vehicle 102. Wireless communications can also be included in the sensor fusion design.

In some embodiments, the environmental sensors 272 can be housed in one or more enclosures on the body of the vehicle 102 to protect the environmental sensors 272 from damage. For example, the environmental sensors 272 can be housed in one or more 3D printed enclosures. For example, in the case where the vehicle 102 is an aerial vehicle, the environmental sensors 272 can be housed within a manifold or enclosure on the underside of the aerial vehicle and powered by microcontrollers.

As one example, the environmental sensors 272 can include a temperature sensor and/or a humidity sensor. For instance, the temperature and humidity can be measured in a single sensor, or in separate temperature and humidity sensors. The environmental humidity and temperature sensors are used for measuring the ambient thermal and air moisture conditions of the survey area. This information can be used for machine learning analysis and categorization of, but not limited to, environmental conditions.

As another example, the environmental sensors 272 can include a soil moisture sensor. Soil moisture can be measured using a capacitive soil moisture sensor. To collect soil moisture information when the vehicle 102 is an aerial vehicle, the vehicle 102 can hover close enough to the ground at the edge of a survey area, inserting a probe of the soil moisture sensor into the ground (e.g., 1-2 cm into the ground) using one or more articulating arms coupled to the vehicle 102. The environmental soil moisture sensor is used for determining the amount of volumetric water present in the uppermost ground layer of the survey area. This information can be used for machine learning analysis and categorization of, but not limited to, environmental conditions and expected GPR performance. The soil moisture depth profile sensors can also be used to gather data for the machine learning analysis and thermal history for infrared camera images.

As still another example, the environmental sensors 272 can include an albedo sensor, such as an albedometer, to estimate albedo in the survey area. In some embodiments, the albedometer can include a combination of multiple pyranometers and thermopile sensors, the data from which can be processed using constitutive relations to produce an albedo estimate as the vehicle is in environmental evaluation mode. As a non-limiting example, the albedometer can include a plurality of pyranometers with one or more pyranometers directed upwards to measure incoming solar radiation from the sky and one or more pyranometers directed downwards to measure solar radiation reflected from the ground. The environmental albedometer sensors are used to gather data for the machine learning analysis and expected performance metrics of infrared camera images and LiDAR.

As yet another example, the environmental sensors 272 can include LiDAR sensors to measure vegetative density, among other things. For example, LiDAR is able to estimate forest canopy density and height using standard density calculations that can take place on microcontrollers in the manifold.

As an example, the vehicle 102 can also be equipped with various types of geophysical sensors 274. The geophysical sensors 274 can be used to measure geophysical properties within the area or region being mapped. For example, the geophysical sensors 274 can include GPR sensors; GPS or other GNSS sensors; accelerometers, gyroscopes, or other inertial sensors; acoustic sensors (e.g., microphones, scalar hydrophones, acoustic intensity sensors, etc.); magnetometers or magnetometer arrays; metal detecting excitation and sensing coils; nuclear quadrupole resonance or other nuclear magnetic resonance sensors; electron beam-based or other X-ray spectral sensors (e.g., an x-ray fluorescence ("XRF") system including a source (e.g., an X-ray tube, an electron beam source) and detector (e.g., scintillator, gas flow proportional counter, etc.)); LiDAR sensors, IR sensors (e.g., IR cameras); optical sensors, including cameras configured to capture images in the visible spectrum and/or optical spectral sensors; UV sensors (e.g., UV cameras); hyperspectral sensors (e.g., push broom scanner, whisk broom scanners, band sequential scanners, staring arrays); and the like.

Figure 4:
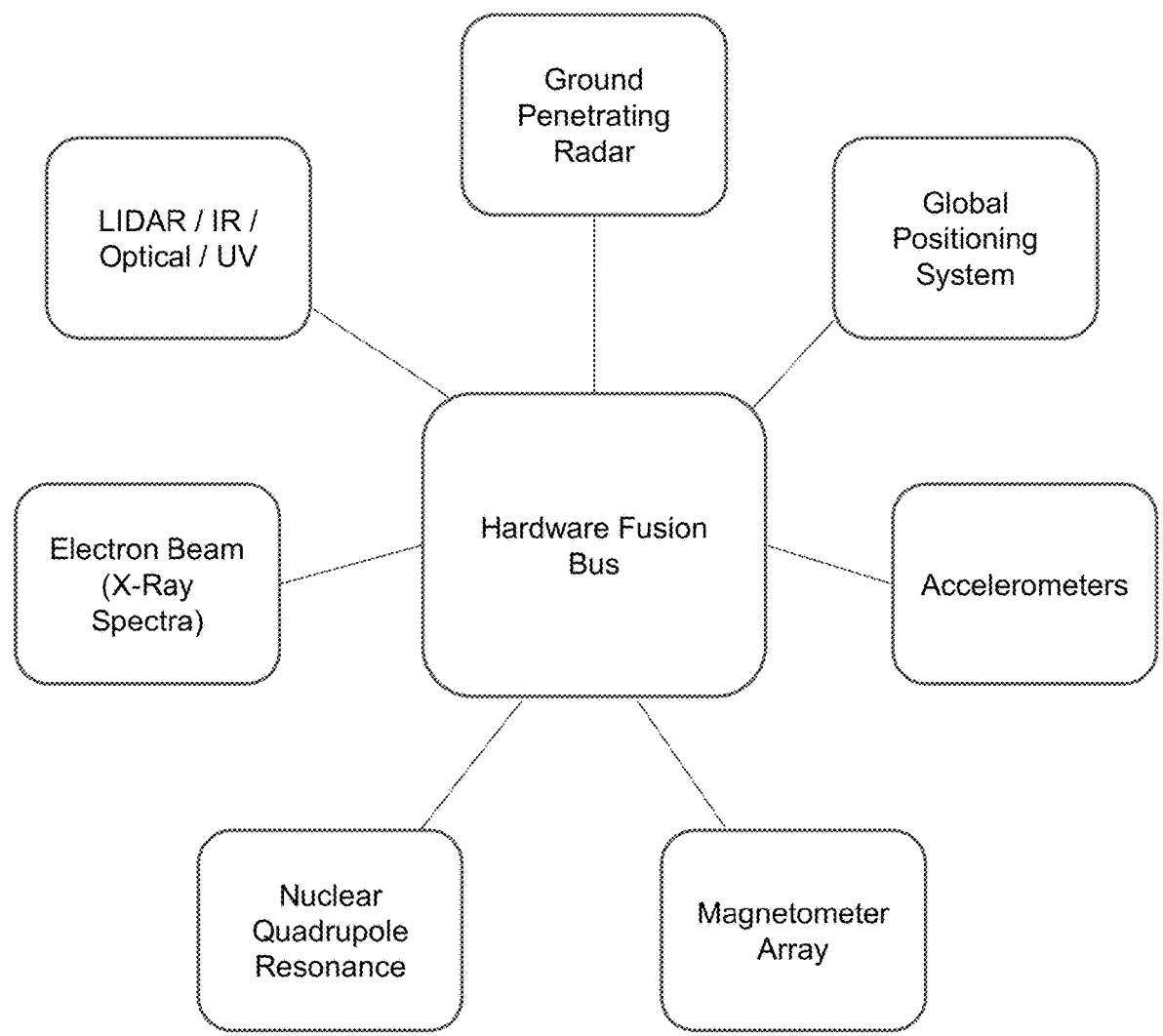
FIG. 4 is a schematic illustration of an example hardware fusion of geophysical sensor data.

As illustrated in FIG. 4, the geophysical sensors 274 can be integrated using a hardware fusion bus, which in some instances may be implemented using microcontroller technology. As described above, to integrate all sensor electronics, microcontrollers and other related hardware can be used to handle power consumption across each sensor instrument. Data output from each geophysical sensor 274 can be converted into a single format to perform a composite inversion for the survey area. The single data output format can be based on each sensor's electrical and signal output design, and can be used to leverage electronics integration best practices to synchronize all data toward a multi-sensor package that will be equipped on the vehicle 102. Wireless communications can also be included in the sensor fusion design.

In some embodiments, the geophysical sensors 274 can be housed in one or more enclosures on the body of the vehicle 102 to protect the geophysical sensors 274 from damage. For example, the geophysical sensors 274 can be housed in one or more 3D printed enclosures. For example, in the case where the vehicle 102 is an aerial vehicle, the geophysical sensors 274 can be housed within a manifold or enclosure on the underside of the aerial vehicle and powered by microcontrollers.

As one example, the geophysical sensors 274 can include one or more GPR sensors. In general, the GPR sensors can include antennas, which may include transmit-only antennas, transmit/receive antennas, and/or multiple transmit and receive antennas. In some embodiments, such as those where the vehicle 102 is an aerial vehicle, the GPR sensors can include one or more directional antennas. Directional antennas can include, but are not limited to, Vivaldi antennas, log-periodic antennas, helical antennas, and spiral antennas. Additionally or alternatively, non-directional antennas may also be used, such as bowtie antennas or the like. The GPR sensors can be constructed with, but not limited to, software defined radar, vector network analyzer, or the like. The GPR sensors in these designs utilize the electric field polarization data in the received antenna data as data sources for mapping. As a non-limiting example when the vehicle 102 is an aerial vehicle, the GPR sensors can include a 120 MHz directional antenna that is optimized for airborne surveys. In some embodiments, the GPR sensors can weigh less than 1 kg.

As another example, the geophysical sensors 274 can include one or more GPS or other GNSS sensors or modules.

As still another example, the geophysical sensors 274 can include one or more inertial sensors, such as one or more accelerometers and/or gyroscopes.

As yet another example, the geophysical sensors 274 can include one or more magnetometers, such may include a magnetometer array. For example, a magnetometer array can be used and configured to measure magnetic fields, magnetic field gradients, and perform auto calibrations, space weather subtraction, and detection of geophysical objects in the shallow earth subsurface. As a non-limiting example, the magnetometer can include a 3-component fluxgate magnetometer, which is able to resolve not only the intensity of a magnetic anomaly, but also its direction. These types of magnetometers are able to detect objects with even trace amounts of metal.

Additionally or alternatively, the geophysical sensors 274 can include NMR-based sensors, such as nuclear quadrupole resonance sensors. For example, nuclear spectra instruments can include the ability to detect elements, mineral types, and rock types. This includes the ability to discover new minerals and geophysical resources including, but not limited to, lithium, uranium, iron, coal, petroleum, natural gas, helium, and titanium.

As another example, the geophysical sensors 274 can include can include X-ray spectral sensors, such as those based on using a particle accelerator to probe the scattered X-rays for elemental analysis. For example, a particle accelerator beam can include the ability to identify X-ray spectra for elements on the geophysical samples. K and L lines from nuclear spectra can be used to show the elemental spectra. As a non-limiting example, the X-ray spectral sensor can be an X-ray fluorescence ("XRF") detector, including a source and a detector. The source can be an X-ray source (e.g., an X-ray tube) or other particle accelerator (e.g., an electron beam source). The detector can be a suitable X-ray detector, including but not limited to, a gas proportional counter or a scintillator.

As yet another example, the geophysical sensors 274 can include one or more optical instrumentation-based sensors, including LiDAR, IR cameras or sensors, visible spectrum cameras or sensors, and/or UV cameras or sensors. The optical instrumentation can be used for analysis including, but not limited to, thermal IR analysis, vegetation density estimation, and ground disturbance analysis. Advantageously, the optical instrumentation can include an IR sensor, such as a FLIR camera, which requires little preprocessing to work with collected data and is capable of detecting various materials of interest, such as metal, plastic, and ceramics via thermal mapping.

In some embodiments, the vehicle 202 may include one or more outputs 292 that are coupled to the electronic controller 220. The output(s) 292 can receive control signals from the electronic controller 220 to generate a visual signal to convey information regarding the operation or state of the vehicle 102 to the user. The output(s) 292 may include, for example, LEDs or a display screen and may generate various signals indicative of, for example, an operational state or mode of the vehicle 102, anomalies detected by the vehicle-based sensor systems, and the like.

In some embodiments, the output(s) 292 can include one or more marking tools or components that can mark the physical location of an anomaly detected by the vehicle-based sensor system. For example, the marking tools or components can include tools for marking a location with paint, tools for marking a location with chalk, and/or tools for providing other visual markers (e.g., flags, flares, etc.).

Figure 5:
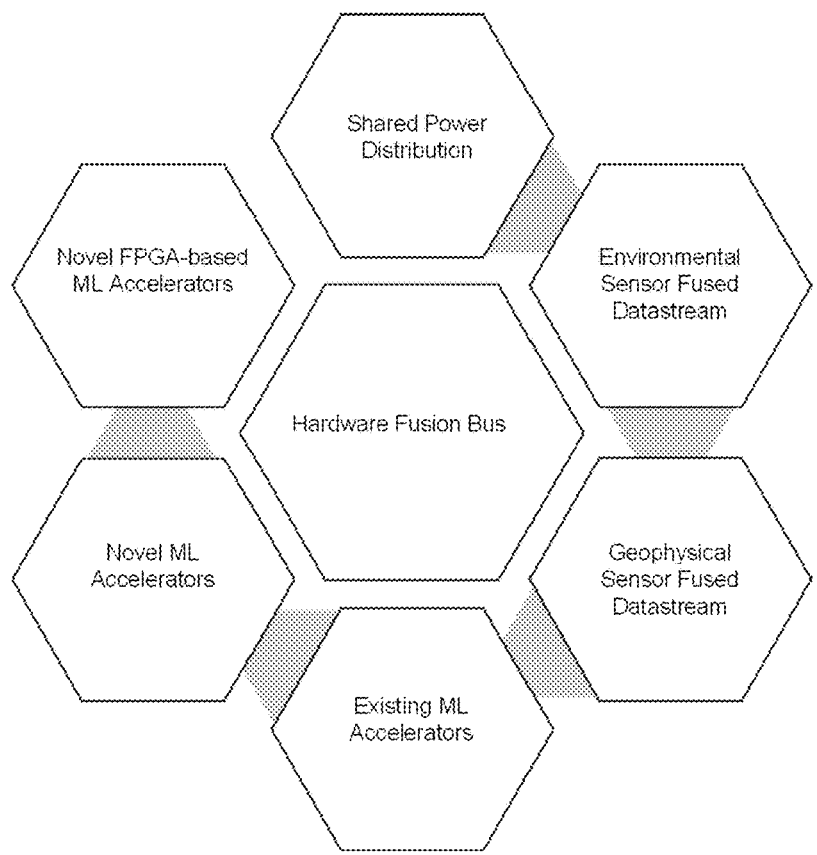
FIG. 5 is a schematic illustration of an example hardware fusion of environmental and geophysical sensor data for detecting anomalies in geophysical sensor data.

In some embodiments, as schematically illustrated in FIG. 5, the vehicle 102 includes components for implementing hardware data fusion, including but not limited to a data bus or busses (e.g., data bus 276), shared system power (e.g., power source 254), environmental sensor-fused data streams (as described above), geophysical sensor-fused data streams (as described above) and the necessary data processing hardware and machine learning hardware accelerators. Machine learning hardware accelerators can include GPUs, TPUs, beyond von-Neumann accelerators (e.g., those described in U.S. Patent Application Publication No. US 2021/0295144, which is herein incorporated by reference in its entirety), and FPGA-based machine learning accelerators (e.g., those described in PCT Application Publication No. WO/2018/213399, which is herein incorporated by reference in its entirety).

One or more data fusion busses connect the geophysical sensor suite to the data processing hardware in these designs. Additionally or alternatively, one or more power busses connect from the vehicle 102 to the geophysical sensors 274 and data processing hardware in these designs.

Figure 6:
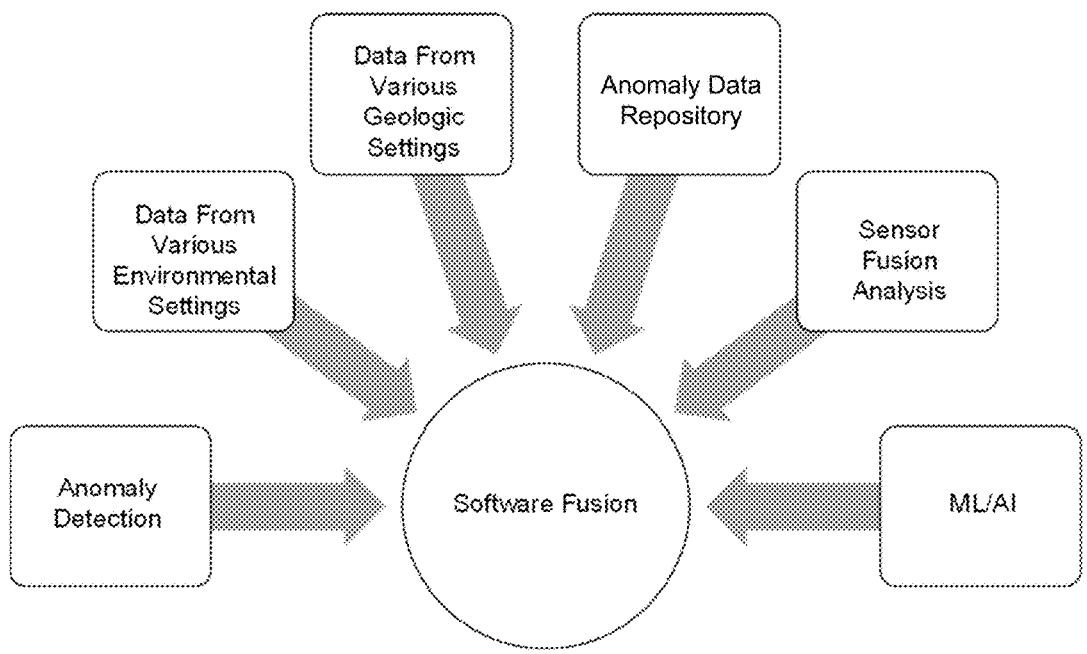
FIG. 6 is a schematic illustration of an example software fusion of various data types and processing for an anomaly detection task.

The vehicle 102 can also be configured to include software data fusion, as schematically illustrated in FIG. 6, including but not limited to machine learning and artificial intelligence coding workflows, sensor fusion analysis, which may be informed by priors including but not limited to a data repository of UXO, civil engineering, or other anomaly test cases; data from various geophysical settings; simulated data under various scenarios; and data from various environmental settings. Anomaly detection and/or characterization can occur as a function of the joint geophysical inversions from the geophysical and environmental sensor suites. Thresholds above or below which detected materials are considered anomalous can be derived from the software data fusion and priors including but not limited to library of anomaly test data, data from various geophysical settings, simulated data under various scenarios, and data from various environmental settings.

Figure 7:
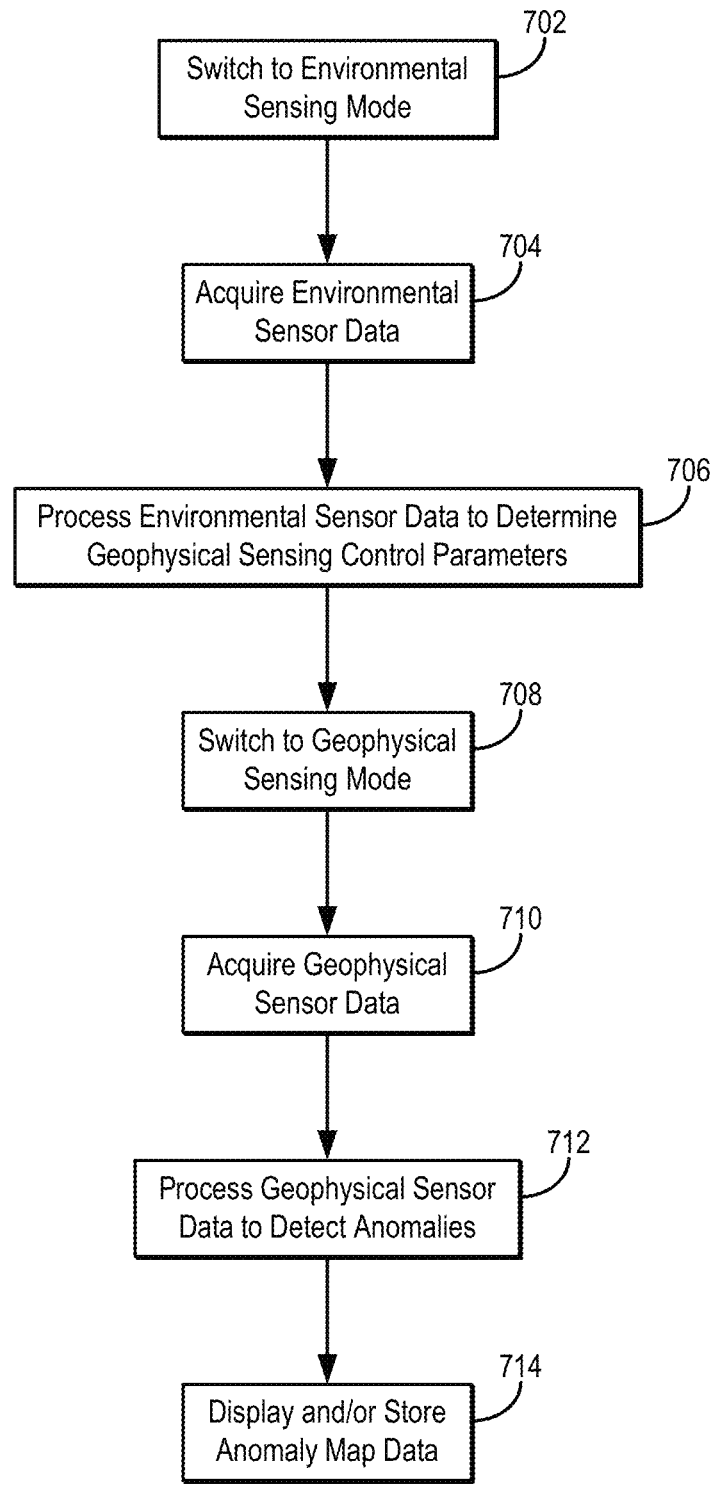
FIG. 7 is a flowchart setting forth the steps of an example method for generating anomaly map data using a vehicle-based anomaly detection and/or mapping system.

Referring now to FIG. 7, a flowchart is illustrated as setting forth the steps of an example method 700 for detecting anomalies in an area or region based on geophysical sensor data acquired from that area or region using a vehicle-based sensor system.

In some embodiments, the vehicle-based anomaly mapping system can include data analytics, including but not limited to Bayesian priors and/or machine learning analysis. As described above, these analysis techniques can take various different environmental and geophysical sensor data types as inputs. For example, the data analytics can process the local weather, known local maps of the survey area, soil temperature measurements, known soil type data for the survey area, known UXO and/or expected UXO data for the survey area (for UXO detection tasks), known other archaeological types (for archeological mapping tasks), known civil engineering survey data (for civil engineering mapping tasks), known geophysical feature data for the survey area, and the like.

The Bayesian priors and machine learning analysis can inform the geophysical inversion of the survey area and be informed by, but not limited, to local weather conditions, known topographic maps, soil temperature, soil type, soil moisture conditions, signal shape from known anomalies (e.g., known UXOs) at survey location, and expected signal shape from known anomalies (e.g., known UXOs) at survey location, among other environmental and/or geophysical sensor data. Machine learning techniques employed include, but are not limited to, CNNs, LSTM networks, scattering transform networks, generative adversarial networks ("GANs"), and recurrent neural networks.

The method 700 includes operating the vehicle (e.g., vehicle 102) to switch into an environmental sensing mode, as indicated at step 702. In this mode, the vehicle scans the survey area or region using the onboard environmental sensors to acquire environmental sensor data, as indicated at step 704. As described above, the environmental sensor data can include measurements of air moisture, air temperature, ground temperature, soil moisture, albedo, and so on. The environmental sensor data are then processed (whether onboard the vehicle or at a remote user station, such as external device 104 or server 106) at step 706 to generate geophysical sensing control parameter data for controlling the handling of the geophysical sensor data acquisition and/or processing. For example, the geophysical sensing control parameter data can include control parameters for operating the vehicle (e.g., controlling the motion of an aerial vehicle depending on the environmental conditions and geophysical sensor type(s)), operating the geophysical sensors (e.g., turning various geophysical sensors on or off depending on the environmental conditions), and/or controlling the processing of the geophysical sensor data (e.g., providing confidence weights to hidden layers of a neural network, otherwise weighting the contributions of various geophysical sensor types).

The vehicle is then switched into a geophysical sensing mode, as indicated at step 708. In this mode, the vehicle again scans the survey area or region, but now using the geophysical sensors to acquire geophysical sensor data, as indicated at step 710. In some embodiments, the geophysical sensing control parameter data are processed by the vehicle in the geophysical sensing mode to control the operation of the vehicle, the geophysical sensors, or both.

As described above, the geophysical sensor data can include GPR data, GPS or GNSS data, accelerometer data, gyroscope data, magnetometer data, acoustic data, NMR data, X-ray spectra data, optical spectral data, hyperspectral data, LiDAR data, IR camera data, visible spectrum camera data, UV camera data, other optical instrumentation data, and so on. The geophysical sensor data are then processed (whether onboard the vehicle or at a remote user station, such as external device 104 or server 106) at step 712 to generate output as anomaly map data. As described above, in some instances the geophysical sensing control parameter data generated at step 706 is used as an input to the processing of the geophysical sensor data. In general, the anomaly map data are generated by computer analysis, including machine learning and/or artificial intelligence analysis, and geophysical inversion of the geophysical sensor data.

The anomaly map data can include one or more anomaly maps that depict anomalies detected within the survey area or region, as well as characteristics and/or attributes of any detected anomalies. The anomaly map may also indicate whether no anomalies are present in the survey area or region. As one example, the anomaly maps may indicate a classification of the area or region depicted in the anomaly map (e.g., by assigning a particular classification to each voxel in the anomaly map). For instance, the anomaly maps can indicate the locations of one or more anomalies in the area or region depicted in the anomaly map. As another example, the anomaly maps may indicate the local probability for a particular classification (i.e., the probability that a voxel belongs to a particular class), such as the presence of a UXO or other anomaly. For instance, the anomaly maps may indicate the location and/or probability of one or more anomalies in the area or region depicted in the anomaly map.

In some instances, the anomaly map can include a multidimensional composite map containing multiple layers of data. For example, the anomaly map may include a map data layer corresponding to a topographic map, satellite image, or other map type. Additionally or alternatively, the anomaly map may also include one or more geophysical sensor data layers corresponding to the different types of geophysical sensor data acquired in the area or region. For instance, the geophysical sensor data layer(s) can depict the distribution of different geophysical sensor data within the area or region, such as GPR data, LIDAR data, IR data, optical data, UV data, magnetics data, X-ray spectral data, optical spectral data, hyperspectral data, acoustic timeseries of spectra, NMR spectra data, etc. The anomaly map can also include one or more anomaly data layers that depict the location, probability, statistics, or other attributes associated with one or more anomalies detected within the area or region.

As an example, in UXO detection applications, the anomaly layer(s) can depict information (e.g., locations, labels, probabilities, statistics, other attributes) associated with UXOs within the area or region. For instance, the anomaly layer(s) can depict the locations of identified UXOs and optionally include labels (e.g., labelling the type of UXO identified, labelling the UXO with a unique identifier, etc.) or other information, such as quantitative information indicating. But not limited to, the chemical composition, shape, and/or burial depths of the detected UXOs.

As another example, in civil engineering and surveying applications, the anomaly layer(s) can depict information (e.g., locations, labels, probabilities, statistics, other attributes) associated with objects of interest for civil engineering and surveying applications (e.g., utilities, waste tanks or reservoirs, tunnels, etc.) that are located within the area or region.

As yet another example, in archeological applications, the anomaly layer(s) can depict information (e.g., locations, labels, probabilities, statistics, other attributes) associated with archeological features of interest (e.g., buried archeological sites, artifacts, etc.) located within the area or region.

As still another example, in geological and/or geophysical applications (e.g., geophysical exploration), the anomaly layer(s) can depict information (e.g., locations, labels, probabilities, statistics, other attributes) associated with geological and/or geophysical features of interest (e.g., mineral deposits, fossil fuels reserves or deposits, lava tube locations and mapping, cave locations and mapping, hydrologic resource tracking) located within the area or region. In some instances, the anomaly layer(s) can also depict parameters or other information associated with the detected geological and/or geophysical features of interest. For example, the feature of interest may be a mineral deposit and the geophysical sensor data can be processed to determine the content of the mineral deposit, such as the chemical and/or atomic content or makeup of the mineral deposit based on X-ray spectral data, optical spectral data, hyperspectral data, and/or NMR spectral data.

The anomaly map data are then displayed and/or stored for later use, as indicated at step 714. In some embodiments, the anomaly map data are generated onboard the vehicle (e.g., by electronic processor 230 and/or machine learning controller 210) and then communicated to a remote user station (e.g., external device 104, server 106) where they are displayed to a user and/or stored for later use.

Figure 8:
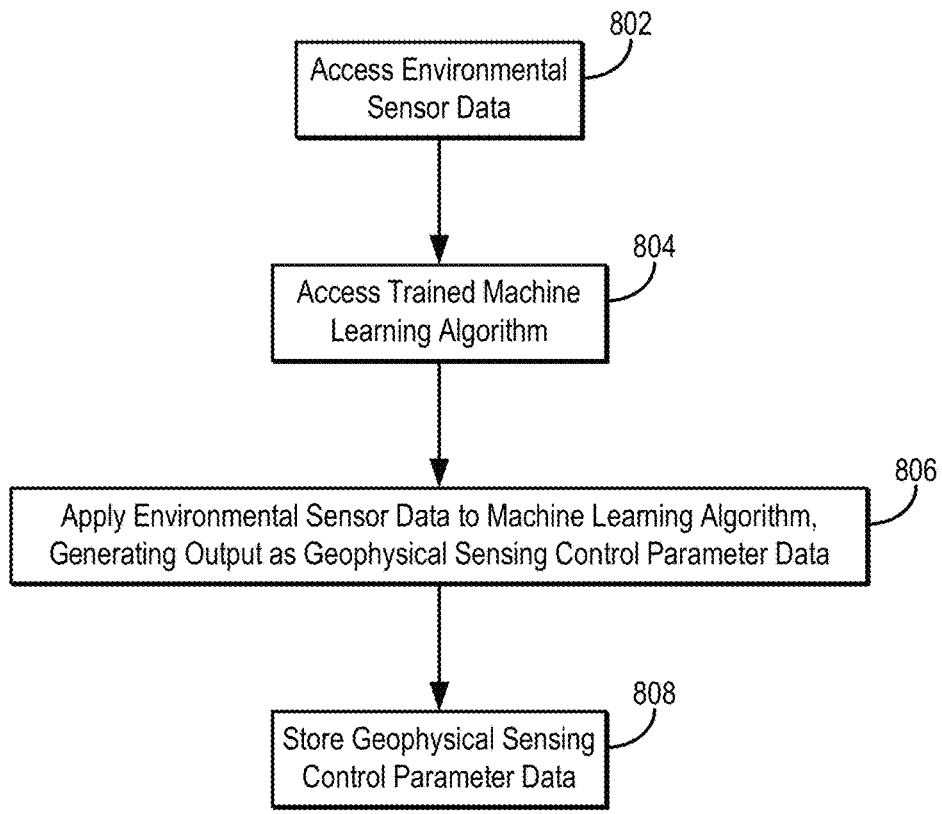
FIG. 8 is a flowchart setting forth the steps of an example method for generating geophysical sensing control parameter data by inputting environmental sensor data to a trained machine learning algorithm, such as a trained neural network.

Referring now to FIG. 8, a flowchart is illustrated as setting forth the steps of an example method 800 for determining control parameters for operating a vehicle-based geophysical sensor system and/or weighting contributions of measured geophysical sensor data in a machine learning algorithm using a suitably trained neural network or other machine learning algorithm.

The method 800 includes accessing environmental sensor data with a computer system, as indicated at step 802. Accessing the environmental sensor data may include retrieving such data from a memory or other suitable data storage device or medium. Additionally or alternatively, accessing the environmental sensor data may include acquiring such data with one or more environmental sensors and transferring or otherwise communicating the data to the computer system, which may be a part of a vehicle-based geophysical sensor system.

A trained neural network (or other suitable machine learning algorithm or model) is then accessed with the computer system, as indicated at step 804. Accessing the trained neural network may include accessing network parameters (e.g., weights, biases, or both) that have been optimized or otherwise estimated by training the neural network on training data. In some instances, accessing the neural network can also include retrieving, constructing, or otherwise accessing the particular neural network architecture to be implemented. For instance, data pertaining to the layers in the neural network architecture (e.g., number of layers, type of layers, ordering of layers, connections between layers, hyperparameters for layers) may be retrieved, selected, constructed, or otherwise accessed.

In general, the neural network is trained, or has been trained, on training data to determine optimal or otherwise preferential control parameters for the vehicle 102 and/or geophysical sensors 274 during a geophysical sensing mode, and/or to determine an optimal or otherwise preferential control parameters for controlling the processing of geophysical sensor data.

In some instances, more than one trained neural network may be accessed. For example, a first neural network may have been trained on first training data to generate control parameters for controlling the operation of the vehicle 102 and/or geophysical sensors 274, and a second neural network may have been trained on second training data to generate control parameters for controlling the confidence weighting of hidden layers in a neural network trained to generate anomaly map data from geophysical sensor data.

The environmental sensor data are then input to the one or more trained neural networks, generating output as geophysical sensing parameter data, as indicated at step 806. For example, the geophysical sensing parameter data may include operational parameters for controlling the operation of geophysical sensors on the vehicle (e.g., indicating which sensors to turn on, which sensors to keep off, regions with the mapped area where certain geophysical sensors should be used, etc.). As another example, the geophysical sensing parameter data may include confidence weight values that can be applied to the hidden layers of a neural network that has been trained to detect anomalies based on geophysical sensor data. In these instances, the confidence weight values can weight the contribution of various geophysical sensor types to the detection and/or characterization of anomalies in the area or region from which the geophysical sensor data were acquired.

The geophysical sensing control parameter data generated by inputting the environmental sensor data to the trained neural network(s) can then be displayed to a user, stored for later use or further processing, or both, as indicated at step 808.

Figure 9:
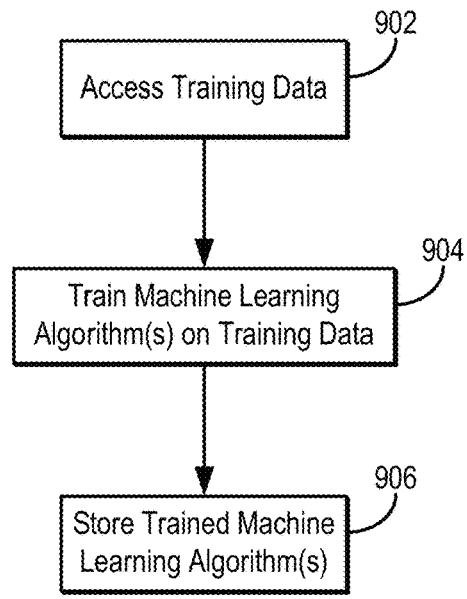
FIG. 9 is a flowchart setting forth the steps of an example method for training a machine learning algorithm to generate geophysical sensing control parameter data from environmental sensor data.

Referring now to FIG. 9, a flowchart is illustrated as setting forth the steps of an example method 900 for training one or more neural networks (or other suitable machine learning algorithms) on training data, such that the one or more neural networks are trained to receive input(s) as environmental sensor data to generate output(s) as geophysical sensing control parameter data.

In general, the neural network(s) can implement any number of different neural network architectures, as described above. For instance, the neural network(s) could implement a convolutional neural network, a recurrent neural network, an LSTM network, and the like.

Alternatively, the neural network(s) could be replaced with other suitable machine learning algorithms, such as those based on supervised learning, unsupervised learning, deep learning, ensemble learning, dimensionality reduction, and so on.

The method 900 includes accessing training data with a computer system, as indicated at step 902. Accessing the training data may include retrieving such data from a memory or other suitable data storage device or medium. Additionally or alternatively, accessing the training data may include acquiring such data with environmental sensors and transferring or otherwise communicating the data to the computer system.

In general, the training data can include environmental sensor data, and may also include geophysical sensor data acquired under similar environmental conditions as the environmental sensor data. The geophysical sensor data in the training data can also include data acquired using different vehicle operation modes.

One or more neural networks (or other suitable machine learning algorithms) are trained on the training data, as indicated at step 904. Training data can include data collected or simulated under various geophysical and environmental conditions. In general, the neural network(s) can be trained by optimizing network parameters (e.g., weights, biases, or both) based on minimizing a loss function. As one non-limiting example, the loss function may be a mean squared error loss function, or the like.

Training a neural network may include initializing the neural network, such as by computing, estimating, or otherwise selecting initial network parameters (e.g., weights, biases, or both). Training data can then be input to the initialized neural network, generating output as geophysical sensing control parameter data. The quality of the output data can then be evaluated, such as by passing the output data to the loss function to compute an error. The current neural network can then be updated based on the calculated error (e.g., using backpropagation methods based on the calculated error). For instance, the current neural network can be updated by updating the network parameters (e.g., weights, biases, or both) to minimize the loss according to the loss function. When the error has been minimized (e.g., by determining whether an error threshold or other stopping criterion has been satisfied), the current neural network and its associated network parameters represent the trained neural network.

The one or more trained neural networks are then stored for later use, as indicated at step 906. Storing the neural network(s) may include storing network parameters (e.g., weights, biases, or both), which have been computed or otherwise estimated by training the neural network(s) on the training data. Storing the trained neural network(s) may also include storing the particular neural network architecture to be implemented. For instance, data pertaining to the layers in the neural network architecture (e.g., number of layers, type of layers, ordering of layers, connections between layers, hyperparameters for layers) may be stored.

Figure 10:
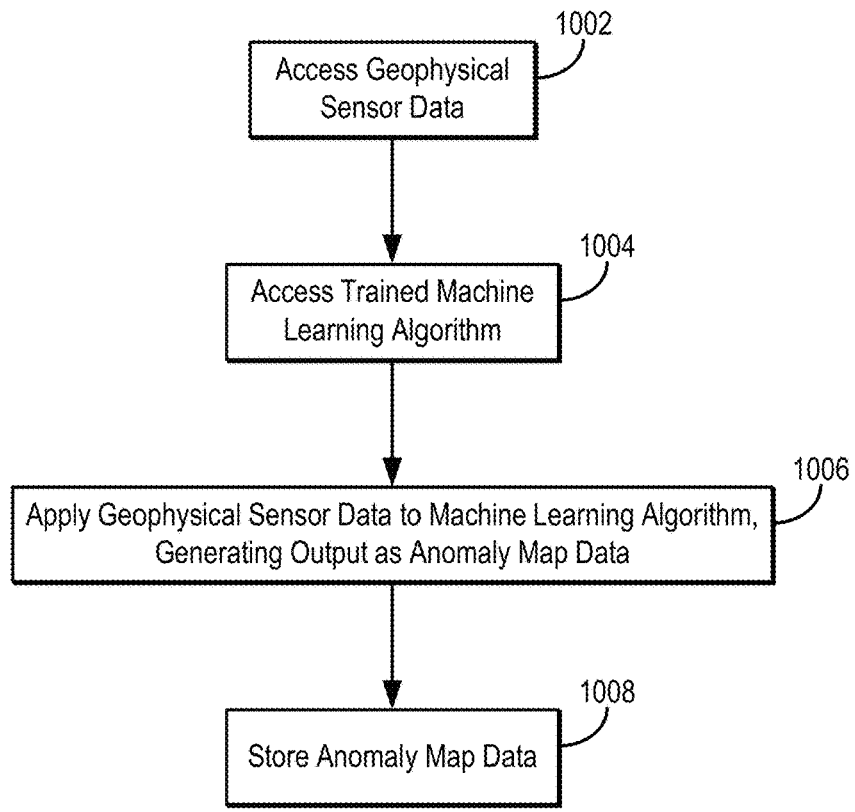
FIG. 10 is a flowchart setting forth the steps of an example method for generating anomaly map data by inputting geophysical sensor data to a trained machine learning algorithm, such as a trained neural network.

Referring now to FIG. 10, a flowchart is illustrated as setting forth the steps of an example method 1000 for generating anomaly map data using a suitably trained neural network or other machine learning algorithm. As described above, the anomaly map data can include one or more maps of an area or region that depict anomalies detected in that area or region based on geophysical sensor data.

The method 1000 includes accessing geophysical sensor data with a computer system, as indicated at step 1002. Accessing the geophysical sensor data may include retrieving such data from a memory or other suitable data storage device or medium. Additionally or alternatively, accessing the geophysical sensor data may include acquiring such data with one or more geophysical sensors (e.g., geophysical sensors 274) and transferring or otherwise communicating the data to the computer system, which may be a part of a vehicle-based anomaly mapping system.

A trained neural network (or other suitable machine learning algorithm or model) is then accessed with the computer system, as indicated at step 1004. Accessing the trained neural network may include accessing network parameters (e.g., weights, biases, or both) that have been optimized or otherwise estimated by training the neural network on training data. In some instances, accessing the neural network can also include retrieving, constructing, or otherwise accessing the particular neural network architecture to be implemented. For instance, data pertaining to the layers in the neural network architecture (e.g., number of layers, type of layers, ordering of layers, connections between layers, hyperparameters for layers) may be retrieved, selected, constructed, or otherwise accessed.

Additionally, accessing the neural network parameters can include accessing control parameters that include confidence weight values generated based on environmental sensor data using method 800. The confidence weight values are applied to hidden layers of the neural network to provide weighting of different types of geophysical sensor data, where the weighting of the geophysical sensor data is optimized or otherwise selected for the particular environmental conditions in the area or region from which the geophysical sensor data have been acquired.

In general, the neural network is trained, or has been trained, on training data to detect or otherwise quantify and/or characterize anomalies based on geophysical sensor data.

The geophysical sensor data are then input to the one or more trained neural networks, generating output as anomaly map data, which may include one or more anomaly maps, as indicated at step 1006. For example, the anomaly map may include a map that depicts the area or region from which the geophysical sensor data have been acquired. The anomaly map may depict the spatial distribution or spatial patterns of features, statistics, attributes, or other parameters associated with one or more anomalies detected and/or characterized within the area or region. When there are no anomalies present in the survey area or region, the anomaly map will also depict the absence of such anomalies.

As one example, the anomaly maps may indicate a classification of the area or region depicted in the anomaly map (e.g., by assigning a particular classification to each voxel in the anomaly map). For instance, the trained neural networks may be trained to generate anomaly maps that indicate the locations of one or more anomalies in the area or region depicted in the anomaly map.

As another example, the anomaly maps may indicate the local probability for a particular classification (i.e., the probability that a voxel belongs to a particular class), such as the presence of a UXO or other anomaly. For instance, the anomaly maps may indicate the location and/or probability of one or more anomalies in the area or region depicted in the anomaly map.

As described above, in some instances, the anomaly map can include a multidimensional composite map containing multiple layers of data, including but not limited to a topography layer, a GPR layer, a LiDAR layer, IR-optical-UV layers, a vegetation density layer, a magnetometry layer, a mineral layer, an X-ray element identification layer, an optical spectral layer, a hyperspectral layer, an acoustic sensor layer, and an NMR layer. The composite map can also have analysis layers based on the detection task, including but not limited to a UXO detection layer, a civil engineering layer, an archeology layer, an emergency response layer, an exploration geophysics layer, a hydrology layer, a porosity layer, and/or an anomaly detection layer. In general, the analysis layers are obtained by computer analysis, including machine learning and artificial intelligence analysis, and geophysical inversion of the geophysical measurement layers.

The anomaly map data generated by inputting the geophysical sensor data (and in some instances geophysical sensing control parameter data) to the trained neural network(s) can then be displayed to a user, stored for later use or further processing, or both, as indicated at step 1008. In some embodiments, the anomaly map data are generated onboard the vehicle (e.g., by electronic processor 230 and/or machine learning controller 210) and then communicated to a remote user station (e.g., external device 104, server 106) where they are displayed to a user and/or stored for later use.

Figure 11:
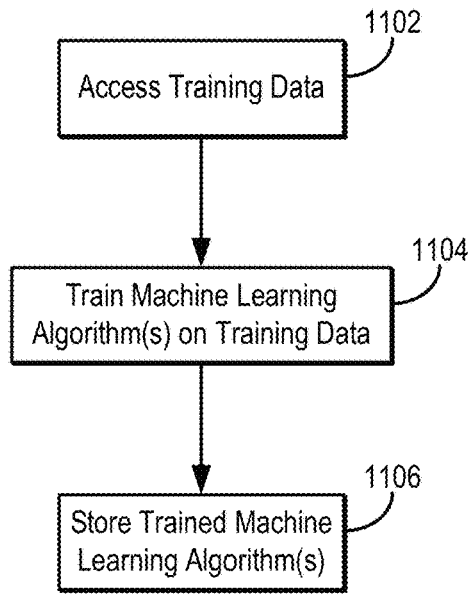
FIG. 11 is a flowchart setting forth the steps of an example method for training a machine learning algorithm to generate anomaly map data from geophysical sensor data.

Referring now to FIG. 11, a flowchart is illustrated as setting forth the steps of an example method 1100 for training one or more neural networks (or other suitable machine learning algorithms) on training data, such that the one or more neural networks are trained to receive input(s) as geophysical sensor data to generate output(s) as anomaly map data.

In general, the neural network(s) can implement any number of different neural network architectures. For instance, the neural network(s) could implement a convolutional neural network, a recurrent neural network, an LSTM network, and the like.

Alternatively, the neural network(s) could be replaced with other suitable machine learning algorithms, such as those based on supervised learning, unsupervised learning, deep learning, ensemble learning, dimensionality reduction, and so on.

The method 1100 includes accessing training data with a computer system, as indicated at step 1102. Accessing the training data may include retrieving such data from a memory or other suitable data storage device or medium. Additionally or alternatively, accessing the training data may include simulating such data using computer software or acquiring such data with geophysical sensors and transferring or otherwise communicating the data to the computer system.

In general, the training data can include simulated or acquired geophysical sensor data and corresponding indications of anomalies that may or may not be present in the area from which the geophysical sensor data were obtained. In some embodiments, accessing the training data may include assembling training data from geophysical sensor data using the computer system. This step may include assembling the geophysical sensor data into an appropriate data structure on which the neural network or other machine learning algorithm can be trained. Assembling the training data may include assembling geophysical sensor data, segmented geophysical sensor data, and other relevant data. For instance, assembling the training data may include generating labeled data and including the labeled data in the training data. Labeled data may include geophysical sensor data, segmented geophysical sensor data, or other relevant data that have been labeled as belonging to, or otherwise being associated with, one or more different classifications or categories. For instance, labeled data may include geophysical sensor data and/or segmented geophysical sensor data that have been labeled based on the presence of anomalies in the area from which the geophysical sensor data were obtained.

One or more neural networks (or other suitable machine learning algorithms) are trained on the training data, as indicated at step 1104. In general, the neural network(s) can be trained by optimizing network parameters (e.g., weights, biases, or both) based on minimizing a loss function. As one non-limiting example, the loss function may be a mean squared error loss function, or the like.

Training a neural network may include initializing the neural network, such as by computing, estimating, or otherwise selecting initial network parameters (e.g., weights, biases, or both). Training data can then be input to the initialized neural network, generating output as anomaly map data. The quality of the output data can then be evaluated, such as by passing the output data to the loss function to compute an error. The current neural network can then be updated based on the calculated error (e.g., using backpropagation methods based on the calculated error). For instance, the current neural network can be updated by updating the network parameters (e.g., weights, biases, or both) to minimize the loss according to the loss function. When the error has been minimized (e.g., by determining whether an error threshold or other stopping criterion has been satisfied), the current neural network and its associated network parameters represent the trained neural network.

The one or more trained neural networks are then stored for later use, as indicated at step 1106. Storing the neural network(s) may include storing network parameters (e.g., weights, biases, or both), which have been computed or otherwise estimated by training the neural network(s) on the training data. Storing the trained neural network(s) may also include storing the particular neural network architecture to be implemented. For instance, data pertaining to the layers in the neural network architecture (e.g., number of layers, type of layers, ordering of layers, connections between layers, hyperparameters for layers) may be stored.

Figure 12:
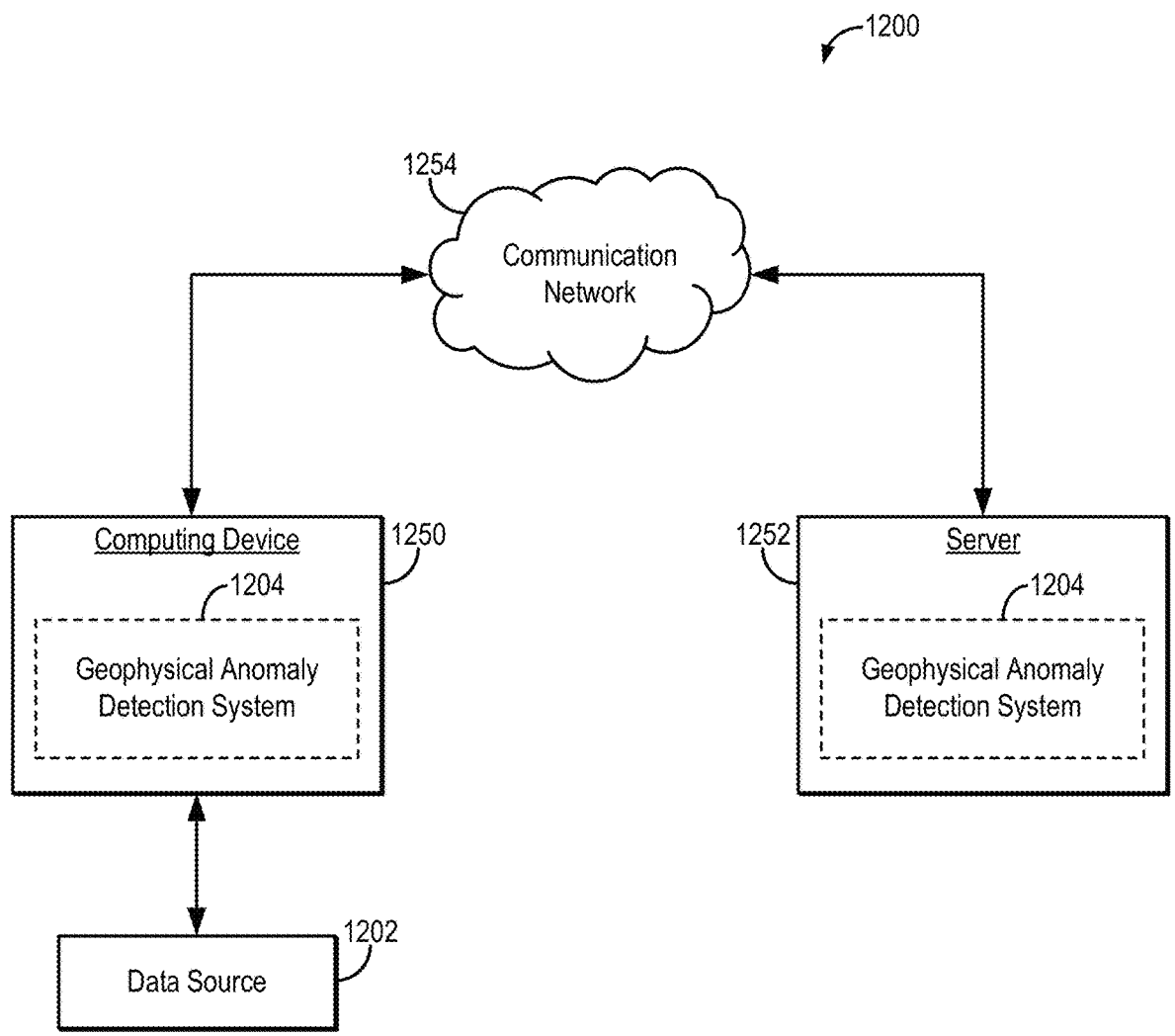
FIG. 12 is a block diagram of an example geophysical anomaly detection system in accordance with some embodiments described in the present disclosure.

Referring now to FIG. 12, an example of a system 1200 for generating anomaly map data in accordance with some embodiments of the systems and methods described in the present disclosure is shown. As shown in FIG. 12, a computing device 1250 can receive one or more types of data (e.g., environmental sensor data, geophysical sensor data, other mapping data) from data source 1202. In some embodiments, computing device 1250 can execute at least a portion of a geophysical anomaly detection system 1204 to generate anomaly map data from geophysical sensor data received from the data source 1202.

Additionally or alternatively, in some embodiments, the computing device 1250 can communicate information about data received from the data source 1202 to a server 1252 over a communication network 1254, which can execute at least a portion of the geophysical anomaly detection system 1204. In such embodiments, the server 1252 can return information to the computing device 1250 (and/or any other suitable computing device) indicative of an output of the geophysical anomaly detection system 1204.

In some embodiments, computing device 1250 and/or server 1252 can be any suitable computing device or combination of devices, such as a desktop computer, a laptop computer, a smartphone, a tablet computer, a wearable computer, a server computer, a virtual machine being executed by a physical computing device, and so on.

In some embodiments, data source 1202 can be any suitable source of data (e.g., environmental sensor data, geophysical sensor data, geophysical sensing control parameter data), such as a vehicle-based anomaly mapping system 100, another computing device (e.g., a server storing data), and so on. In some embodiments, data source 1202 can be local to computing device 1250. For example, data source 1202 can be incorporated with computing device 1250 (e.g., computing device 1250 can be configured as part of a device for measuring, recording, estimating, acquiring, or otherwise collecting or storing data). As another example, data source 1202 can be connected to computing device 1250 by a cable, a direct wireless link, and so on. Additionally or alternatively, in some embodiments, data source 1202 can be located locally and/or remotely from computing device 1250, and can communicate data to computing device 1250 (and/or server 1252) via a communication network (e.g., communication network 1254).

In some embodiments, communication network 1254 can be any suitable communication network or combination of communication networks. For example, communication network 1254 can include a WiFi® network (which can include one or more wireless routers, one or more switches, etc.), a peer-to-peer network (e.g., a Bluetooth® network), a cellular network (e.g., a 3G network, a 4G network, etc., complying with any suitable standard, such as CDMA, GSM, LTE™, LTE Advanced, WiMAX®, etc.), other types of wireless network, a wired network, and so on. In some embodiments, communication network 1254 can be a local area network, a wide area network, a public network (e.g., the Internet), a private or semi-private network (e.g., a corporate or university intranet), any other suitable type of network, or any suitable combination of networks. Communications links shown in FIG. 12 can each be any suitable communications link or combination of communications links, such as wired links, fiber optic links, Wi-Fi® links, Bluetooth® links, analog or digital VHF links, analog or digital UHF links, cellular links, and so on.

Figure 13:
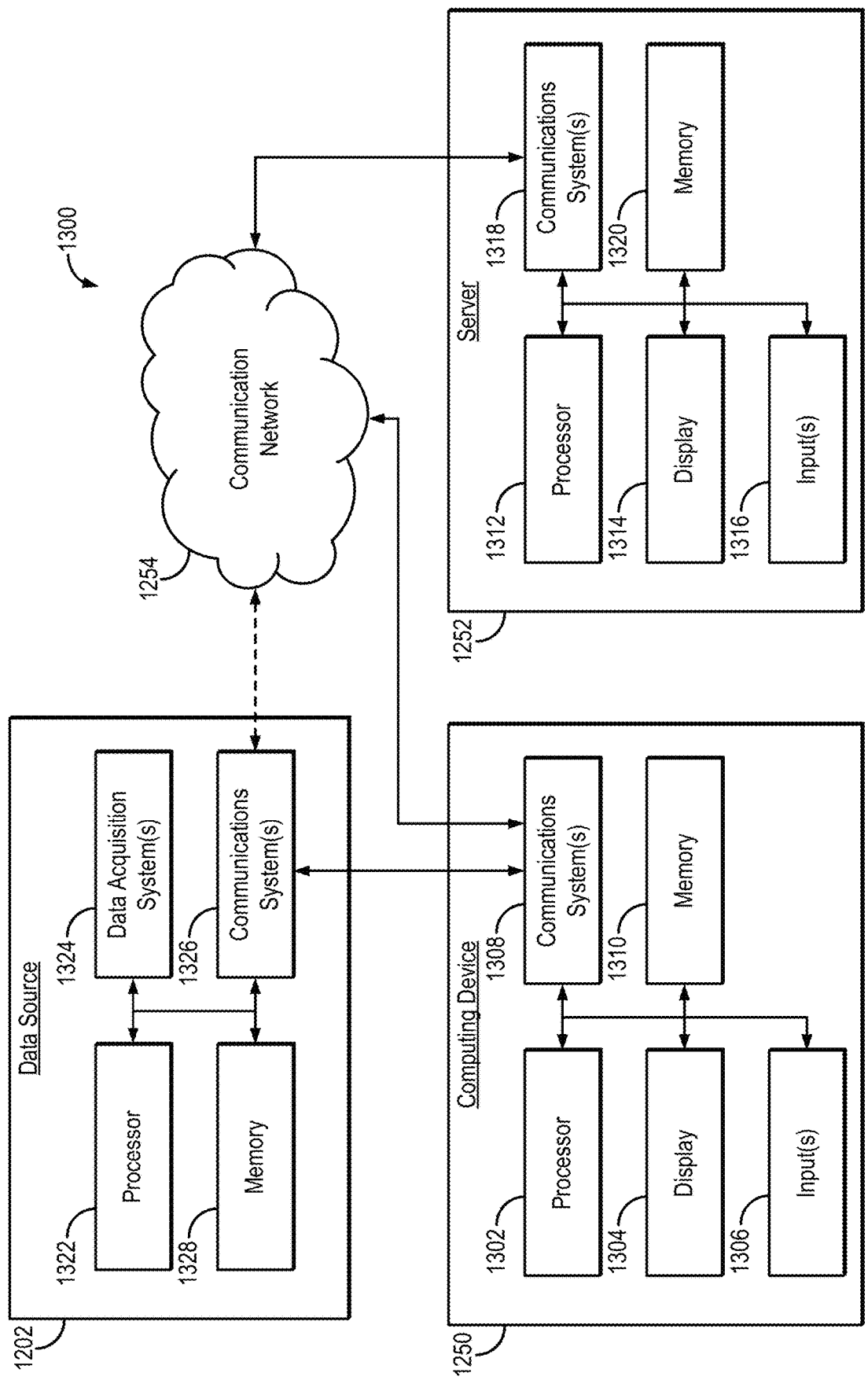
FIG. 13 is a block diagram of example components that can implement the geophysical anomaly detection system of FIG. 12.

Referring now to FIG. 13, an example of hardware 1300 that can be used to implement data source 1202, computing device 1250, and server 1252 in accordance with some embodiments of the systems and methods described in the present disclosure is shown.

As shown in FIG. 13, in some embodiments, computing device 1250 can include a processor 1302, a display 1304, one or more inputs 1306, one or more communication systems 1308, and/or memory 1310. In some embodiments, processor 1302 can be any suitable hardware processor or combination of processors, such as a central processing unit ("CPU"), a graphics processing unit ("GPU"), and so on. In some embodiments, display 1304 can include any suitable display devices, such as a liquid crystal display ("LCD") screen, a light-emitting diode ("LED") display, an organic LED ("OLED") display, an electrophoretic display (e.g., an "e-ink" display), a computer monitor, a touchscreen, a television, and so on. In some embodiments, inputs 1306 can include any suitable input devices and/or sensors that can be used to receive user input, such as a keyboard, a mouse, a touchscreen, a microphone, and so on.

In some embodiments, communications systems 1308 can include any suitable hardware, firmware, and/or software for communicating information over communication network 1254 and/or any other suitable communication networks. For example, communications systems 1308 can include one or more transceivers, one or more communication chips and/or chip sets, and so on. In a more particular example, communications systems 1308 can include hardware, firmware, and/or software that can be used to establish a WiFi® connection, a Bluetooth® connection, an analog or digital VHF connection, an analog or digital UHF connection, a cellular connection, an Ethernet connection, and so on.

In some embodiments, memory 1310 can include any suitable storage device or devices that can be used to store instructions, values, data, or the like, that can be used, for example, by processor 1302 to present content using display 1304, to communicate with server 1252 via communications system(s) 1308, and so on. Memory 1310 can include any suitable volatile memory, non-volatile memory, storage, or any suitable combination thereof. For example, memory 1310 can include random-access memory ("RAM"), read-only memory ("ROM"), electrically programmable ROM ("EPROM"), electrically erasable ROM ("EEPROM"), other forms of volatile memory, other forms of non-volatile memory, one or more forms of semi-volatile memory, one or more flash drives, one or more hard disks, one or more solid state drives, one or more optical drives, and so on. In some embodiments, memory 1310 can have encoded thereon, or otherwise stored therein, a computer program for controlling operation of computing device 1250. In such embodiments, processor 1302 can execute at least a portion of the computer program to present content (e.g., images, user interfaces, graphics, tables), receive content from server 1252, transmit information to server 1252, and so on. For example, the processor 1302 and the memory 1310 can be configured to perform the methods described herein (e.g., the method 700 of FIG. 7; the method 800 of FIG. 8; the method 900 of FIG. 9; the method 1000 of FIG. 10; and/or the method 1100 of FIG. 11).

In some embodiments, server 1252 can include a processor 1312, a display 1314, one or more inputs 1316, one or more communications systems 1318, and/or memory 1320. In some embodiments, processor 1312 can be any suitable hardware processor or combination of processors, such as a CPU, a GPU, and so on. In some embodiments, display 1314 can include any suitable display devices, such as an LCD screen, LED display, OLED display, electrophoretic display, a computer monitor, a touchscreen, a television, and so on. In some embodiments, inputs 1316 can include any suitable input devices and/or sensors that can be used to receive user input, such as a keyboard, a mouse, a touchscreen, a microphone, and so on.

In some embodiments, communications systems 1318 can include any suitable hardware, firmware, and/or software for communicating information over communication network 1254 and/or any other suitable communication networks. For example, communications systems 1318 can include one or more transceivers, one or more communication chips and/or chip sets, and so on. In a more particular example, communications systems 1318 can include hardware, firmware, and/or software that can be used to establish a WiFi® connection, a Bluetooth® connection, an analog or digital VHF connection, an analog or digital UHF connection, a cellular connection, an Ethernet connection, and so on.

In some embodiments, memory 1320 can include any suitable storage device or devices that can be used to store instructions, values, data, or the like, that can be used, for example, by processor 1312 to present content using display 1314, to communicate with one or more computing devices 1250, and so on. Memory 1320 can include any suitable volatile memory, non-volatile memory, storage, or any suitable combination thereof. For example, memory 1320 can include RAM, ROM, EPROM, EEPROM, other types of volatile memory, other types of non-volatile memory, one or more types of semi-volatile memory, one or more flash drives, one or more hard disks, one or more solid state drives, one or more optical drives, and so on. In some embodiments, memory 1320 can have encoded thereon a server program for controlling operation of server 1252. In such embodiments, processor 1312 can execute at least a portion of the server program to transmit information and/or content (e.g., data, images, a user interface) to one or more computing devices 1250, receive information and/or content from one or more computing devices 1250, receive instructions from one or more devices (e.g., a personal computer, a laptop computer, a tablet computer, a smartphone), and so on.

In some embodiments, the server 1252 is configured to perform the methods described in the present disclosure. For example, the processor 1312 and memory 1320 can be configured to perform the methods described herein (e.g., the method 700 of FIG. 7; the method 800 of FIG. 8; the method 900 of FIG. 9; the method 1000 of FIG. 10; and/or the method 1100 of FIG. 11).

In some embodiments, data source 1202 can include a processor 1322, one or more data acquisition systems 1324, one or more communications systems 1326, and/or memory 1328. In some embodiments, processor 1322 can be any suitable hardware processor or combination of processors, such as a CPU, a GPU, and so on. In some embodiments, the one or more data acquisition systems 1324 are generally configured to acquire environmental sensor data, geophysical sensor data, or both, and can include environmental sensors 272, geophysical sensors 274, and the like. Additionally or alternatively, in some embodiments, the one or more data acquisition systems 1324 can include any suitable hardware, firmware, and/or software for coupling to and/or controlling operations of environmental sensors 272, geophysical sensors 274, or the like. In some embodiments, one or more portions of the data acquisition system(s) 1324 can be removable and/or replaceable.

Note that, although not shown, data source 1202 can include any suitable inputs and/or outputs. For example, data source 1202 can include input devices and/or sensors that can be used to receive user input, such as a keyboard, a mouse, a touchscreen, a microphone, a trackpad, a trackball, and so on. As another example, data source 1202 can include any suitable display devices, such as an LCD screen, an LED display, an OLED display, an electrophoretic display, a computer monitor, a touchscreen, a television, etc., one or more speakers, and so on.

In some embodiments, communications systems 1326 can include any suitable hardware, firmware, and/or software for communicating information to computing device 1250 (and, in some embodiments, over communication network 1254 and/or any other suitable communication networks). For example, communications systems 1326 can include one or more transceivers, one or more communication chips and/or chip sets, and so on. In a more particular example, communications systems 1326 can include hardware, firmware, and/or software that can be used to establish a wired connection using any suitable port and/or communication standard (e.g., VGA, DVI video, USB, RS-232, etc.), Wi-Fi® connection, a Bluetooth® connection, an analog or digital VHF connection, an analog or digital UHF connection, a cellular connection, an Ethernet connection, and so on.

In some embodiments, memory 1328 can include any suitable storage device or devices that can be used to store instructions, values, data, or the like, that can be used, for example, by processor 1322 to control the one or more data acquisition systems 1324, and/or receive data from the one or more data acquisition systems 1324; to generate images from data; present content (e.g., images, a user interface) using a display; communicate with one or more computing devices 1250; and so on. Memory 1328 can include any suitable volatile memory, non-volatile memory, storage, or any suitable combination thereof. For example, memory 1328 can include RAM, ROM, EPROM, EEPROM, other types of volatile memory, other types of non-volatile memory, one or more types of semi-volatile memory, one or more flash drives, one or more hard disks, one or more solid state drives, one or more optical drives, and so on. In some embodiments, memory 1328 can have encoded thereon, or otherwise stored therein, a program for controlling operation of data source 1202. In such embodiments, processor 1322 can execute at least a portion of the program to generate images, transmit information and/or content (e.g., data, images) to one or more computing devices 1250, receive information and/or content from one or more computing devices 1250, receive instructions from one or more devices (e.g., a personal computer, a laptop computer, a tablet computer, a smartphone, etc.), and so on.

In some embodiments, any suitable computer-readable media can be used for storing instructions for performing the functions and/or processes described herein. For example, in some embodiments, computer-readable media can be transitory or non-transitory. For example, non-transitory computer-readable media can include media such as magnetic media (e.g., hard disks, floppy disks), optical media (e.g., compact discs, digital video discs, Blu-ray discs), semiconductor media (e.g., RAM, flash memory, EPROM, EEPROM), any suitable media that is not fleeting or devoid of any semblance of permanence during transmission, and/or any suitable tangible media. As another example, transitory computer-readable media can include signals on networks, in wires, conductors, optical fibers, circuits, or any suitable media that is fleeting and devoid of any semblance of permanence during transmission, and/or any suitable intangible media.

The present disclosure has described one or more preferred embodiments, and it should be appreciated that many equivalents, alternatives, variations, and modifications, aside from those expressly stated, are possible and within the scope of the present disclosure and associated claims.

The invention claimed is:

1. A method for producing a map depicting geophysical anomalies in an area based on geophysical sensor data, the method comprising:
   (a) accessing environmental sensor data with a computer system, the environmental sensor data being indicative of environmental conditions in an area;
   (b) accessing a first machine learning algorithm with the computer system, wherein the first machine learning algorithm has been trained on first training data to determine confidence weights from environmental conditions;
   (c) generating confidence weight values by applying the environmental sensor data to the first machine learning algorithm, generating a first output as the confidence weight values;
   (d) accessing geophysical sensor data with a computer system, the geophysical sensor data being indicative of data acquired from the area using a plurality of different geophysical sensors;
   (e) accessing a second machine learning algorithm with the computer system, wherein the second machine learning algorithm has been trained on second training data to identify anomalies in the area from the geophysical sensor data acquired from the area;
   (f) generating anomaly map data by applying the geophysical sensor data to the second machine learning algorithm and using the confidence weight values as an input to the second machine learning algorithm to control contributions of different ones of the geophysical sensors when generating the anomaly map data, generating a second output as the anomaly map data; and
   (g) providing the anomaly map data to a user, wherein the anomaly map data comprise an anomaly map depicting at least one anomaly in the area.

2. The method of claim 1, wherein the accessing the environmental sensor data comprises acquiring the environmental sensor data using environmental sensors coupled to a vehicle.

3. The method of claim 1, wherein the accessing the geophysical sensor data comprises acquiring the geophysical sensor data using the plurality of different geophysical sensors.

4. The method of claim 1, wherein the first machine learning algorithm is a neural network.

5. The method of claim 1, wherein the second machine learning algorithm is a neural network and the using the confidence weight values as an input to the second machine learning algorithm comprises applying the confidence weight values to hidden layers of the neural network.

6. The method of claim 1, wherein the environmental sensor data comprise at least one of soil moisture data, soil temperature data, air moisture data, air temperature data, or albedo.

7. The method of claim 1, wherein the geophysical sensor data comprise at least one of ground penetrating radar data, magnetometer data, optical instrumentation data, X-ray spectral data, optical spectral data, hyperspectral data, nuclear magnetic resonance data, acoustic data, or accelerometer data.

8. The method of claim 7, wherein the optical instrumentation data comprise at least one of visible spectrum camera data, infrared camera data, or ultraviolet camera data.

9. The method of claim 1, wherein the anomaly map depicts a location of the at least one anomaly.

10. The method of claim 9, wherein the anomaly map depicts a probability of the location of the at least one anomaly.

11. The method of claim 1, wherein the at least one anomaly comprises an unexploded ordnance.

12. The method of claim 1, wherein the at least one anomaly comprises a mineral deposit.

13. The method of claim 12, wherein the anomaly map further comprises a mineral deposit layer indicating a type of a mineral in the mineral deposit.

14. The method of claim 13, wherein the type of the mineral is determined based on the geophysical sensor data that comprise at least one of X-ray spectral data, optical spectral data, hyperspectral data, or nuclear magnetic resonance data.

15. The method of claim 1, wherein the at least one anomaly comprises a civil engineering survey object.

16. The method of claim 15, wherein the civil engineering survey object includes at least one of an electrical utility, a gas utility, a water utility, a waste tank, a sewer, or a tunnel.

17. The method of claim 1, wherein the at least one anomaly comprises a geophysical feature.

18. The method of claim 17, wherein the geophysical feature includes at least one of a lava tube, a cave, or a hydrologic resource.

19. A method for generating an anomaly map depicting geophysical anomalies in an area, the method comprising:
   (a) acquiring environmental sensor data using environmental sensors coupled to a vehicle;
   (b) processing the environmental sensor data using an electronic processor housed on the vehicle to generate geophysical sensing control parameter data for controlling a geophysical sensing mode of the vehicle;
   (c) acquiring geophysical sensor data using geophysical sensors coupled to the vehicle while in the geophysical sensing mode; and
   (d) processing the geophysical sensor data using the electronic processor to generate an anomaly map that depicts at least one anomaly within the area.

20. The method of claim 19, wherein the environmental sensor data are processed by the electronic processor by inputting the environmental sensor data to a machine learning algorithm, generating an output as the geophysical sensing control parameter data.

21. The method of claim 20, wherein the machine learning algorithm comprises a neural network.

22. The method of claim 19, wherein the geophysical sensor data are processed by the electronic processor by inputting the geophysical sensor data to a machine learning algorithm, generating an output as the anomaly map.

23. The method of claim 22, wherein the machine learning algorithm comprises a neural network.

24. The method of claim 23, wherein the geophysical sensing control parameter data comprise confidence weight values that are input to hidden layers of the neural network by the electronic processor to weigh different geophysical sensor data types based on environmental conditions in the area as measured by the environmental sensors.

25. The method of claim 19, wherein the geophysical sensing control parameter data are processed by the electronic processor to control an operation of the vehicle when the vehicle is in the geophysical sensing mode.

26. The method of claim 25, wherein the vehicle is an aerial vehicle and processing the geophysical sensing control parameter data by the electronic processor controls the operation of the aerial vehicle based on the environmental conditions in the area and on which the geophysical sensors are being used to acquire the geophysical sensor data.

27. The method of claim 25, wherein processing the geophysical sensing control parameter data by the electronic processor controls the operation of the geophysical sensors such that different ones of the geophysical sensors are operated to acquire the geophysical sensor data based on the environmental conditions in the area.

28. The method of claim 19, wherein the anomaly map depicts a location of the at least one anomaly.

29. The method of claim 28, wherein the anomaly map depicts a probability of the location of the at least one anomaly.

30. A vehicle-based system for mapping geophysical anomalies within an area, the vehicle-based system comprising:
   a vehicle;
   a plurality of environmental sensors coupled to the vehicle;
   a plurality of geophysical sensors coupled to the vehicle; and
   an electronic processor housed within the vehicle and in communication with the plurality of environmental sensors and the plurality of geophysical sensors, the electronic processor being configured to:
      acquire environmental sensor data with the plurality of environmental sensors;
      acquire geophysical sensor data with the plurality of geophysical sensors; and
      generate an anomaly map that depicts at least one anomaly within an area using the environmental sensor data and the geophysical sensor data.

31. The vehicle-based system of claim 30, wherein the electronic processor is configured to generate the anomaly map by:
   accessing a first neural network;
   inputting the environmental sensor data to the first neural network, generating output as confidence weight values for hidden layers in a second neural network;
   accessing the second neural network; and
   inputting the confidence weight values and the geophysical sensor data to the second neural network, generating output as the anomaly map.

32. The vehicle-based system of claim 30, wherein the vehicle is an aerial vehicle.

33. The vehicle-based system of claim 32, wherein the aerial vehicle is an unmanned aerial vehicle (UAV).

34. The vehicle-based system of claim 33, wherein the UAV is an autonomously controlled UAV.

35. The vehicle-based system of claim 30, wherein the vehicle is a ground-based vehicle.

36. The vehicle-based system of claim 35, wherein the ground-based vehicle is an unmanned ground vehicle (UGV).

37. The vehicle-based system of claim 36, wherein the UGV is an autonomously controlled UGV.

38. The vehicle-based system of claim 30, wherein the vehicle comprises a trailer that is coupled to another vehicle.

39. The vehicle-based system of claim 38, wherein the trailer is fabricated from at least one of non-ferromagnetic materials or non-metallic materials.

40. The vehicle-based system of claim 30, wherein the environmental sensors comprise at least one of a soil moisture sensor, a soil temperature sensor, an air moisture sensor, an air temperature sensor, or an albedometer; and further wherein the environmental sensor data comprises information regarding environmental conditions in the area which is utilized by the electronic processor to control operation of the geophysical sensors such that different ones of the geophysical sensors are operated to acquire the geophysical sensor data based on the environmental conditions in the area.

41. The vehicle-based system of claim 40, wherein the geophysical sensors comprise at least one of a ground penetrating radar sensor, a magnetometer, a metal detecting excitation coil, a metal detecting sensing coil, an optical instrumentation sensor, an X-ray spectral sensor, an optical spectral sensor, a hyperspectral sensor, an acoustic sensor, a nuclear magnetic resonance sensor, or an inertial sensor.

42. The vehicle-based system of claim 41, wherein the magnetometer comprises at least one of a 3-component fluxgate magnetometer or a magnetometer array.

43. The vehicle-based system of claim 41, wherein the optical instrumentation sensor comprises at least one of a visible spectrum camera, an infrared camera, or an ultraviolet camera.

* * * * *